United States Patent [19]
Itoh et al.

[11] Patent Number: 5,802,308
[45] Date of Patent: Sep. 1, 1998

[54] LOAD CONTROL SYSTEM FOR CENTRALIZED MANAGEMENT/CONTROL TYPE NETWORK

[75] Inventors: Yayoi Itoh; Fumiyasu Ige, both of Yokohama; Tadaaki Tanaka, Kawasaki, all of Japan

[73] Assignee: Fujitsu Limited, Kanagawa, Japan

[21] Appl. No.: 634,887

[22] Filed: Apr. 19, 1996

[30] Foreign Application Priority Data

Apr. 20, 1995 [JP] Japan ................. 7-094944

[51] Int. Cl.⁶ ............................. G06F 17/00
[52] U.S. Cl. ............................. 365/200.62
[58] Field of Search .............. 395/200.62, 675, 395/200.53; 370/230, 244, 259; 379/266

[56] References Cited

U.S. PATENT DOCUMENTS

| | | | |
|---|---|---|---|
| 4,497,979 | 2/1985 | Phelan | 370/244 |
| 4,984,264 | 1/1991 | Katsube | 379/230 |
| 5,425,086 | 6/1995 | Hidaka et al. | |
| 5,442,789 | 8/1995 | Baker et al. | 395/675 |
| 5,655,120 | 8/1997 | Witte et al. | 395/675 |

FOREIGN PATENT DOCUMENTS

| | | |
|---|---|---|
| 62-125750 | 6/1987 | Japan . |
| 5-130669 | 5/1993 | Japan . |

*Primary Examiner*—Ellis B. Ramirez
*Attorney, Agent, or Firm*—Helfgott & Karas, P.C.

[57] ABSTRACT

In a first aspect of the invention, the load on a central management/control apparatus is monitored to determine a control rate appropriate to the load, and inquiries from an inquiry execution apparatus or an exchange are controlled by rejecting inquiries in proportion to the control rate. In enforcing the control, a control process is selected, in accordance with the load, from among: a control process 1 in which the inquiry execution apparatus is notified when an inquiry has been rejected; a control process 2 in which inquires are rejected without issuing a notification; a control process 3 in which the inquiry execution apparatus is instructed to control inquiries; and a control process 4 in which at least two of these control processes are combined. In a second aspect of the invention, the occurrence of an overload condition is prevented by rejecting all inquiries arising from specific calls.

24 Claims, 21 Drawing Sheets

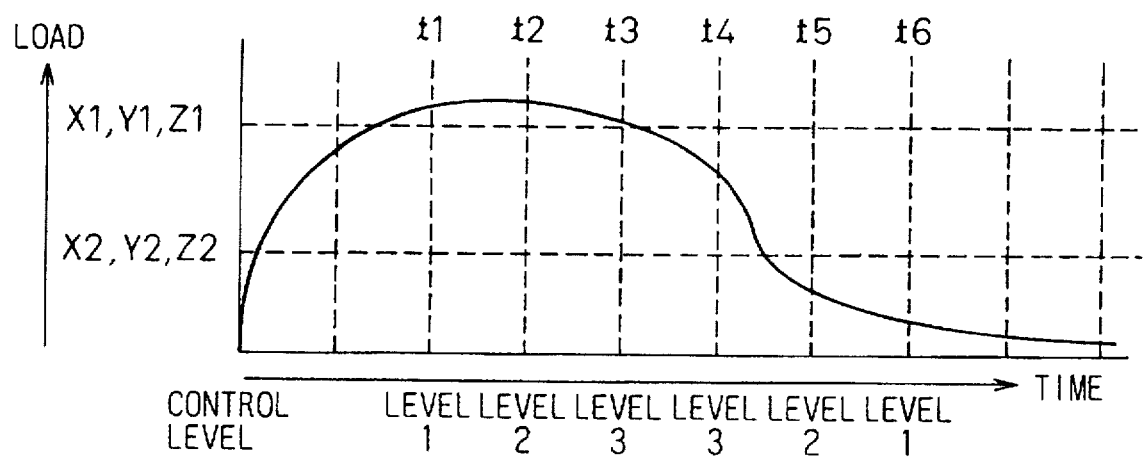

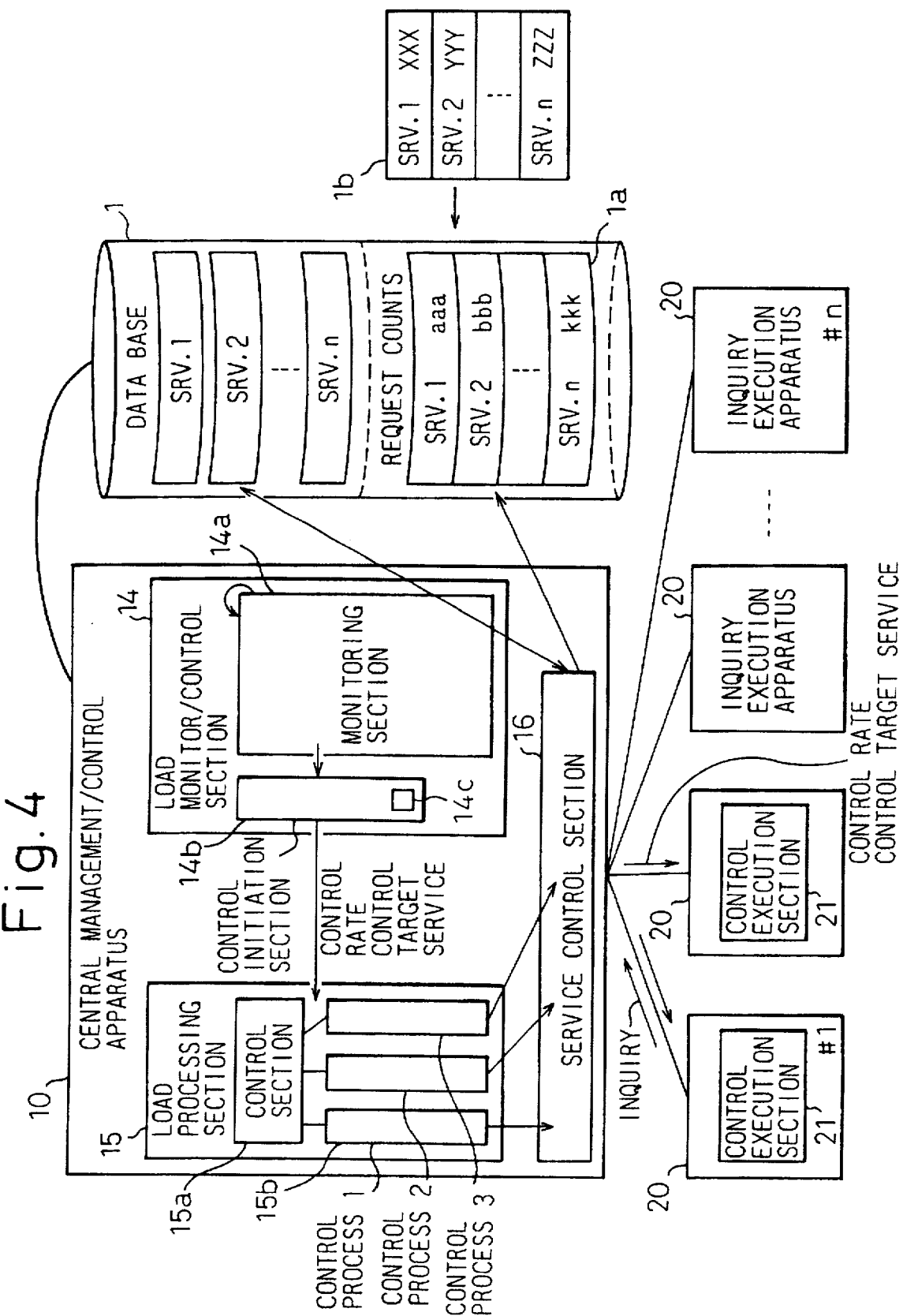

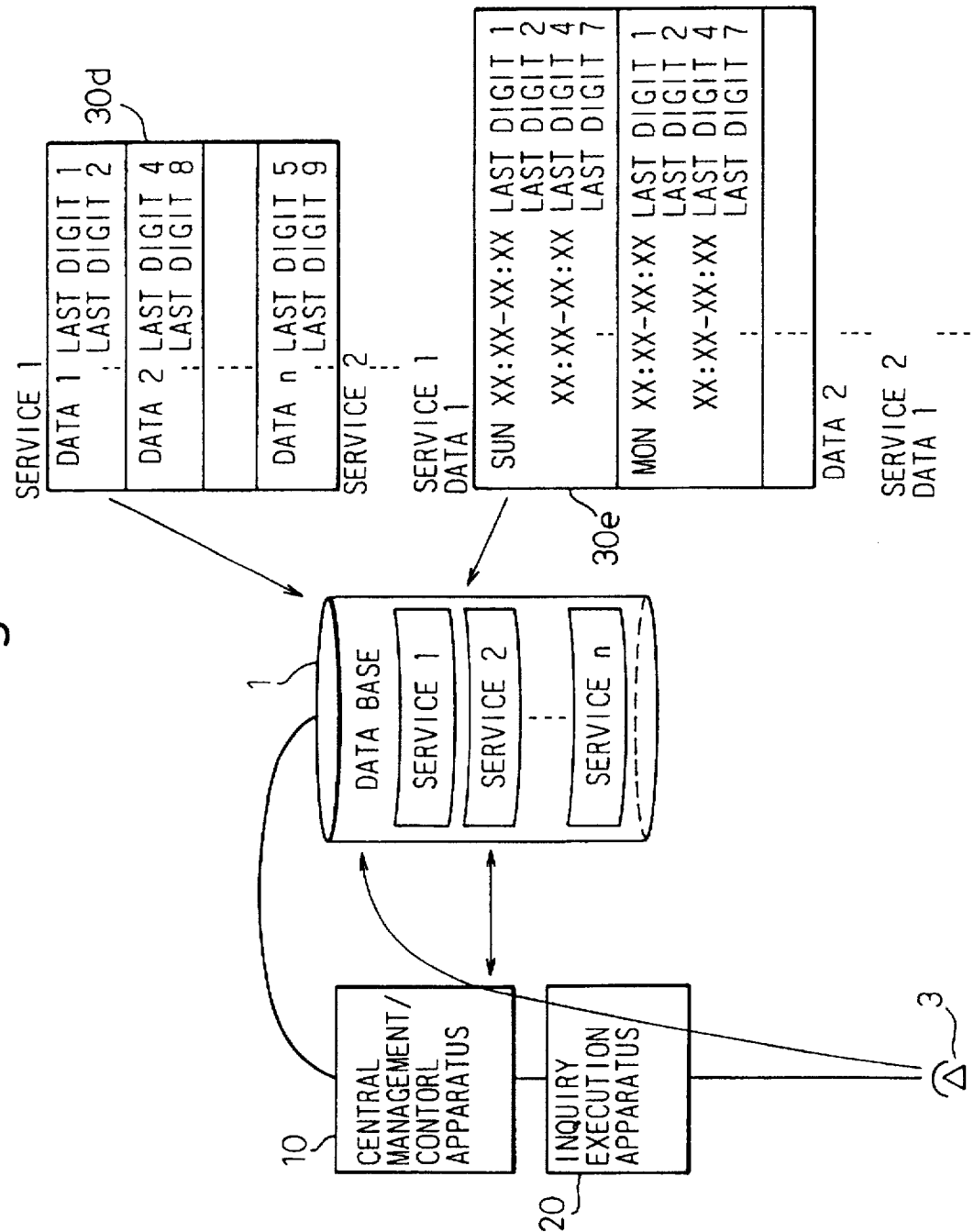

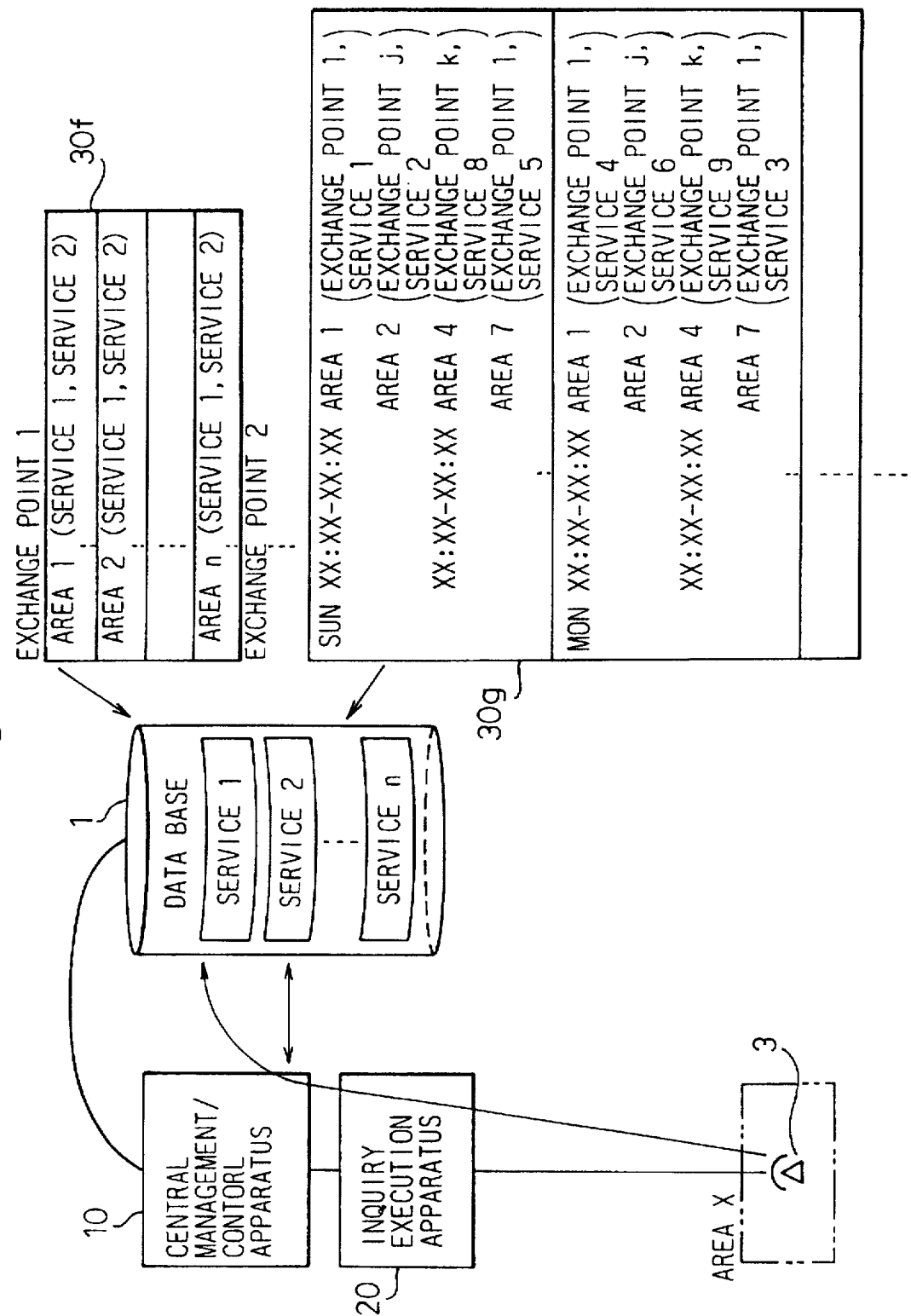

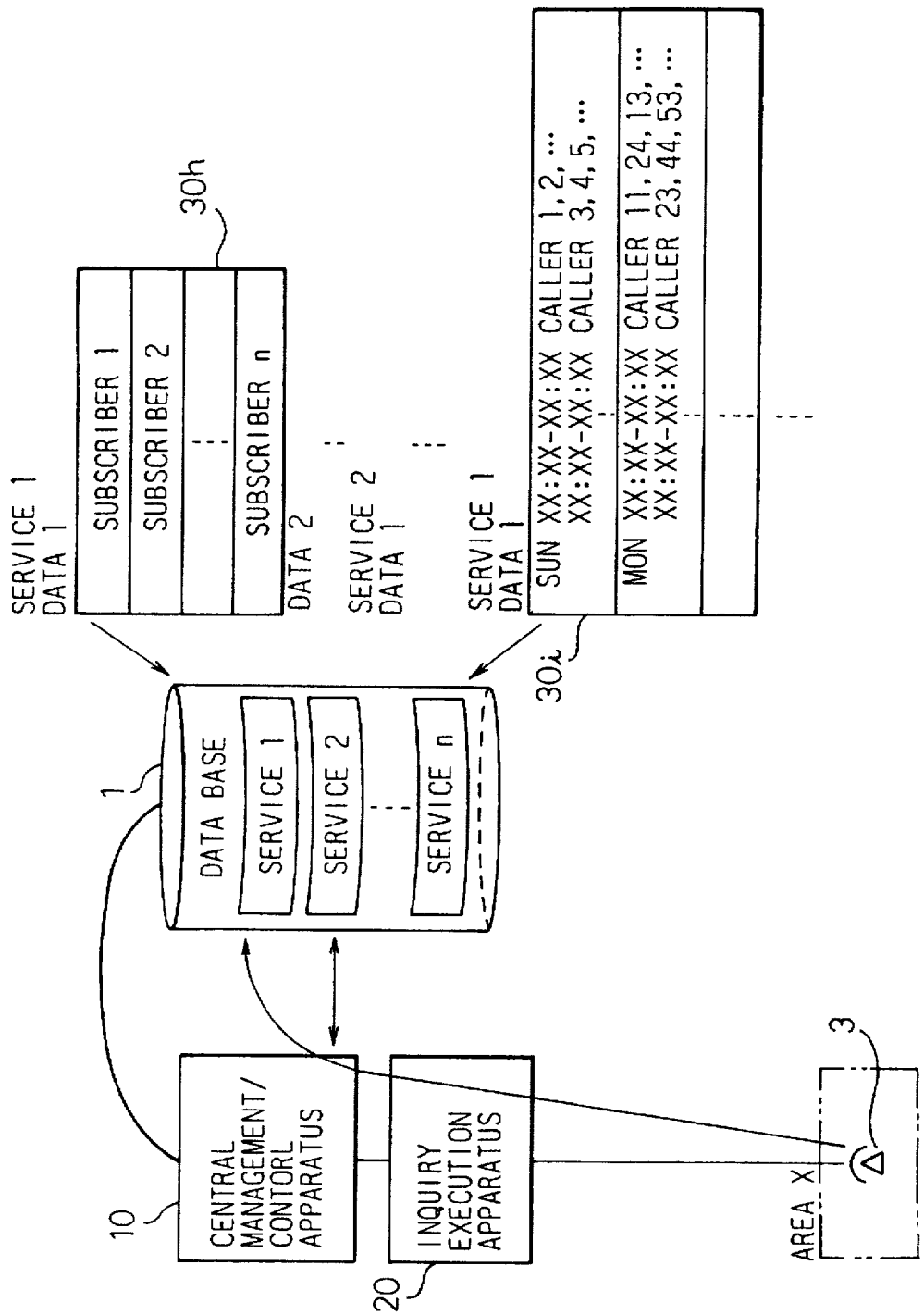

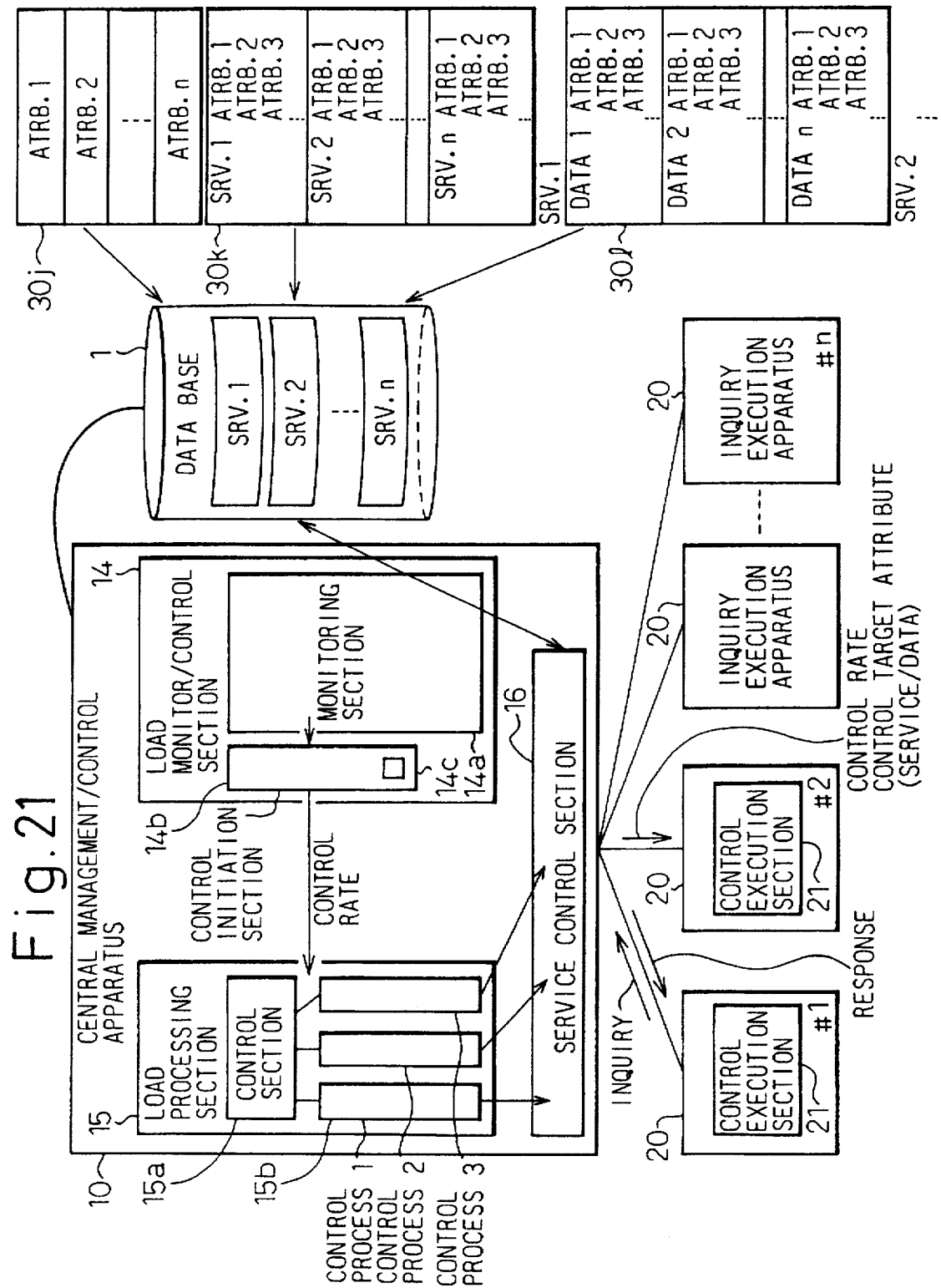

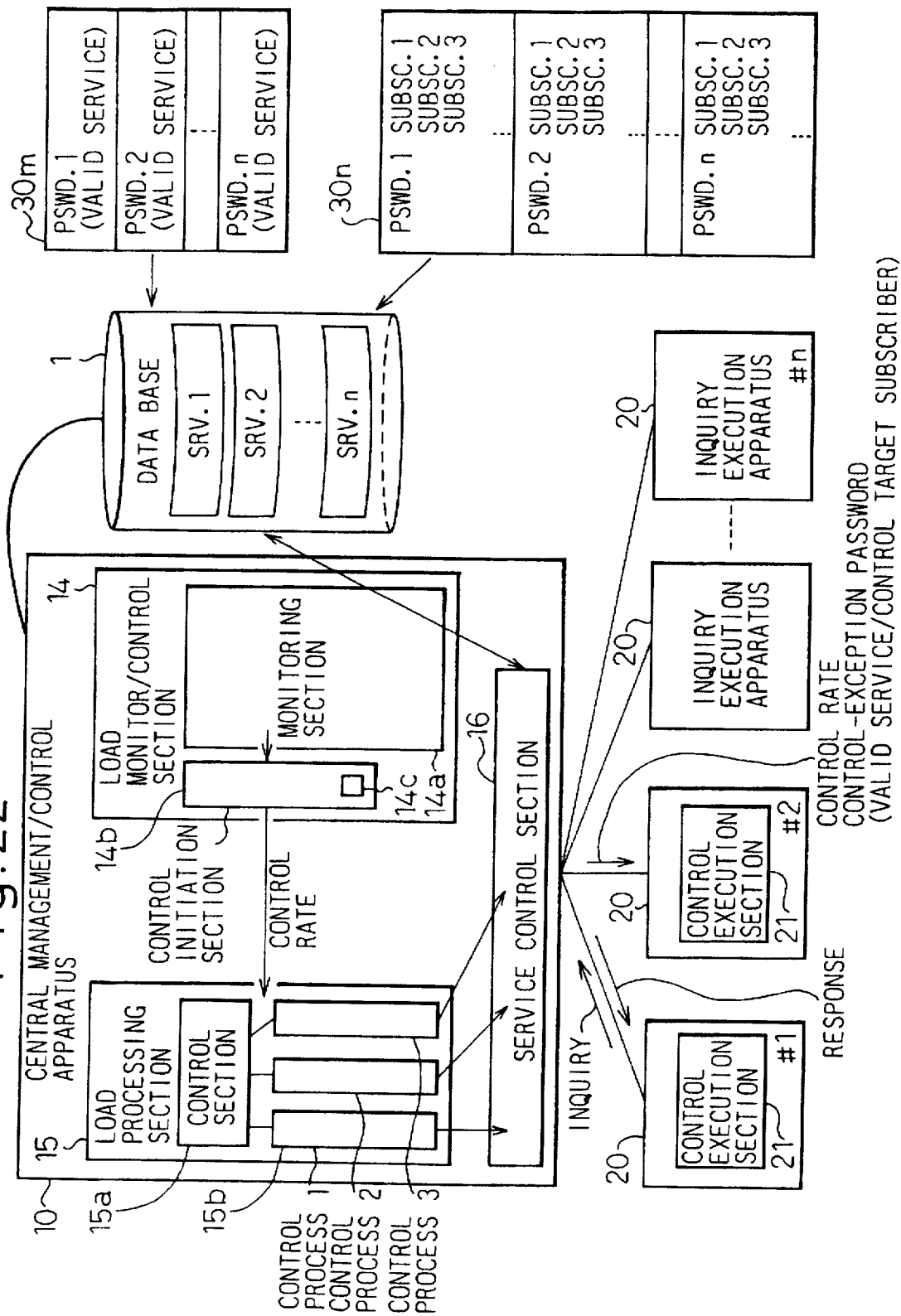

LOAD CONTROL SYSTEM FOR CENTRALIZED MANAGEMENT/CONTROL TYPE NETWORK

BACKGROUND OF THE INVENTION

1. Field of the Invention

The present invention relates to a load control system for a centralized management/control type network, and more particularly to a load control system for avoiding or preventing overload of a central management/control apparatus in a centralized management/control type network in which data are maintained and controlled centrally.

Centralized management/control type networks provide network controls that assist the realization of an advanced information society demanded by society, and centrally control various inquiry execution apparatuses by using a central management/control apparatus, thereby making it possible to readily meet requests for new services that may arise in the future.

In a centralized management/control type network, since only one central management/control apparatus is used which characterizes the network of this type, there is a possibility that when too many inquiries are sent to the central management/control apparatus in a short period of time, for example, the processing capacity of the central management/control apparatus may be reduced, leading in the worst case to a situation where the system fails and becomes unable to respond to any kind of inquiry arriving over the network.

It is therefore necessary and essential for a centralized management/control type network to be equipped with every possible method or means for automatically or manually controlling the system to avoid overload of the central management/control apparatus or to prevent overload when an overload condition is expected in advance, thereby preventing the occurrence of a system failure.

2. Description of the Related Art

As an overload control method for a centralized management/control type network, and more specifically as a method applied for an intelligent network, the Automatic Call Gapping (ACG) method proposed by Bell Communication Research and others is commonly used. In the ACG method, the central management/control apparatus notifies inquiry execution apparatus (also called service exchange points) of an inquiry control time (for example, a time of 3 seconds, etc.), during which time the inquiry execution apparatus refrains from sending inquiries to the central management/control apparatus.

A central management/control apparatus of the prior art comprises: a load monitor/control section for monitoring the traffic condition of a network as well as its own workload and for determining a control time according to the traffic and load conditions; and a load processing section for controlling the inquiry execution apparatus in accordance with the control time supplied from the load monitor/control section. A database, where various service control data (for example, service control data for toll-free telephone service) are stored, is connected to the central management/control apparatus.

Also connected to the central management/control apparatus are a plurality of inquiry execution apparatuses (also called service exchange points) for executing inquiries for various services.

The inquiry execution apparatuses are connected to a central office exchange to which subscriber terminals and private branch exchanges (PBXs) are connected. Internal terminals are connected to each PBX. In an alternative configuration, the inquiry execution apparatus may be provided within the central office exchange.

In the thus constructed system, when an inquiry is made by an inquiry execution apparatus to the central management/control apparatus, the load processing section in the central management/control apparatus searches the database to retrieve the requested service control data. At the same time, the load monitor/control section determines the control time based on the traffic condition of the network and on the workload of itself, and notifies the load processing section accordingly. The load processing section returns a response to the requesting inquiry execution apparatus along with the control time for the next inquiry. The inquiry execution apparatus refrains from sending inquiries to the central management/control apparatus during the control time thus notified.

The above-described prior art system has the problem of being unable to control the load effectively, as will be described below.

(i) Since condition decision logic for calculating an effective control time is complicated, the control process involves increased processing load.

(ii) In the method of controlling the load by using a control time, control tends to be carried too far, limiting even inquiries that could otherwise be handled by the central management/control apparatus. This could degrade the quality of service. This tendency is particularly pronounced when the number of inquiry execution apparatus under control of the central management/control apparatus is small.

(iii) In the method of controlling the load by using a control time, since the number of inquiries to the central management/control apparatus abruptly increases after the control time has passed, there are cases in which the overload condition cannot be prevented effectively and the control based on the control time is enforced once again, iteratively invoking the control process, and hence, an inability to perform smooth control.

Furthermore, in the prior art overload control method, the following points have not been taken into account.

(i) Minimizing the degradation in quality of service, or the effects on other services, in accordance with the cause that triggered an overload.

(ii) Enabling the administrator to change the load control method in accordance with the situation leading up to overload so that he can adjust the load control while confirming the effect of the load control.

(iii) Preventing the occurrence of an overload condition when an overload is expected.

In centralized management/control type networks, the demand for which is expected to further increase in the future, it is of the utmost importance to make provisions to avoid and prevent overload of the central management/control apparatus which could affect the entire network, and the need for automatic or manual overload control capability against every possible situation is most pressing.

SUMMARY OF THE INVENTION

In view of the above-enumerated problems, it is an object of the present invention to provide a load control system for a centralized management/control type network, that can avoid and prevent the occurrence of overload in the central management/control apparatus by performing overload control effectively in accordance with factors causing the overload.

According to the present invention, there is provided a load control apparatus, connected to at least one inquiry execution apparatus, for controlling the load on a central management/control apparatus by controlling inquiries issued from the inquiry execution apparatus to the central management/control apparatus responsible for processing and responding to the inquiries, comprising: a load monitor/control section for monitoring the load of the central management/control apparatus and for determining a control rate appropriate to the load; and a load processing section for controlling the load by rejecting inquiries in proportion to the control rate.

According to the present invention, there is also provided a load control apparatus, connected to at least one inquiry execution apparatus, for controlling the load on a central management/control apparatus by controlling inquiries issued from the inquiry execution apparatus to the central management/control apparatus responsible for processing and responding to the inquiries, comprising: means for rejecting all inquiries arising from calls of a predesignated kind.

BRIEF DESCRIPTION OF THE DRAWINGS

FIG. 2 is a diagram showing an example of a control rate table;

FIG. 3 is a diagram for explaining the determination of a control level that matches load variation according to the present invention;

FIG. 4 is a block diagram showing a second example of the present invention;

FIG. 18 is a block diagram showing a sixteenth example of the present invention;

FIG. 19 is a block diagram showing a seventeenth example of the present invention;

FIG. 20 is a block diagram showing an eighteenth example of the present invention;

FIG. 21 is a block diagram showing a nineteenth example of the present invention; and FIG. 22 is a block diagram showing a twentieth example of the present invention.

DESCRIPTION OF THE PREFERRED EMBODIMENTS

Figure 1:
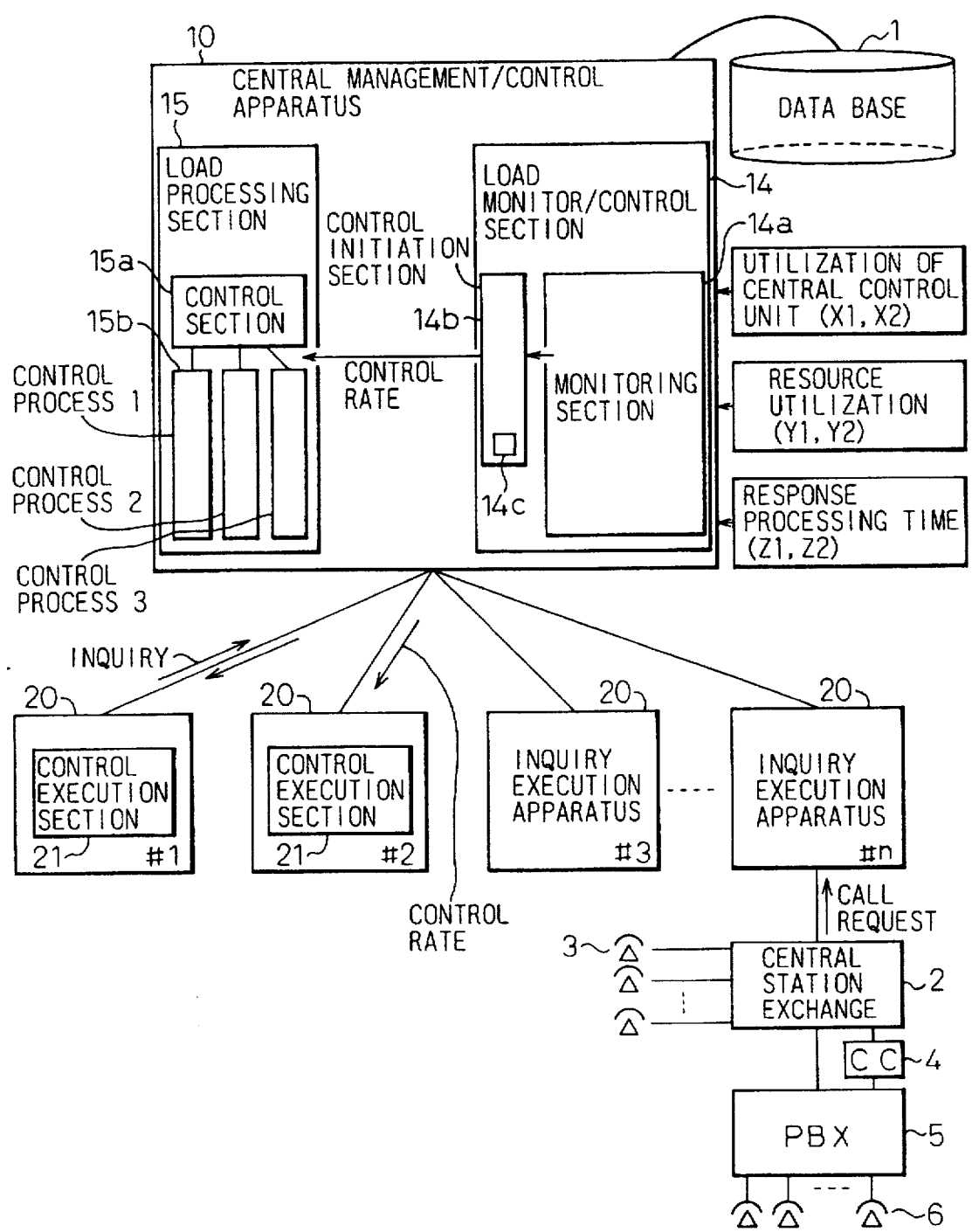
FIG. 1 is a block diagram showing a first example of the present invention.

FIG. 1 is a block diagram of a system according to a first example of the present invention. In the figure, reference numeral 1 is a database where various service control data are stored; 10 is a central management/control apparatus for conducting a search and analysis on the data base 1 in response to an inquiry, and for issuing an instruction appropriate to the results of the search and analysis; and 20 is one or more inquiry execution apparatus for issuing an inquiry to the central management/control apparatus, and for performing prescribed processing in accordance with the result of the inquiry.

Further, reference numeral 2 is a central office exchange to which the inquiry execution apparatuses 20 are connected; 3 are subscriber terminals connected to the central office exchange 2; 4 is a central control unit (CC) for controlling switching operations of the central office exchange 2; 5 is a private branch exchange (PBX) connected to the central office exchange 2; and 6 are internal terminals connected to the private branch exchange 5. In the configuration shown, the inquiry execution apparatuses 20 are separate from the central office exchange 2, but alternatively, they may be provided within the central office exchange 2.

In the illustrated example, a number, n, of inquiry execution apparatuses 20, numbered #1 to #n, are provided, the minimum necessary number being one (this also applies to the examples hereinafter described). In the central management/control apparatus 10, reference numeral 14 designates a load monitor/control section for monitoring and controlling the load on the basis of various kinds of load information data, and 15 indicates a load processing section for processing the load for each inquiry execution apparatus 20 on the basis of control rate data supplied from the load monitor/control section 14.

In the load monitor/control section 14, reference numeral 14a denotes a monitoring section for monitoring the amount of traffic on the basis of the various kinds of load information data, and 14b represents a control initiation section for determining and outputting the control rate for each inquiry execution apparatus 20 on the basis of an output from the monitoring section 14a. The control initiation section 14b contains a control rate table 14c where control rates corresponding to control levels in various control processes are stored.

The load information data include, as shown in the figure, for example, data on the utilization of the central control unit responsible for controlling the central management/control apparatus 10, data on the utilization of shared resources which are used by the central management/control apparatus 10 when performing processing, and data on response processing time taken until a response to an inquiry is returned from the inquiry execution apparatus 20. The upper and lower limit values are respectively designated as X1 and X2 for the utilization of the central control unit, Y1 and Y2 for the utilization of the shared resources, and Z1 and Z2 for the response processing time. The number of inquiry requests per unit time also can be used as the load information data.

FIG. 2 shows an example of the control rate table 14c. Control levels, starting from level 1 in increasing order, are set for each of control processes 1 to 4 (to be described hereinafter). For example, when control process i is selected, the control rate is 10% for control level 1, 20% for control level 2, and 30% for control level 3.

In the load processing section 15, reference numeral 15a is a control section for performing various controls, and 15b is various control processes which include the above-mentioned control processes 1 to 4. Details of the control processes will be described below.

Control Process 1

Control is performed on inquiries from the inquiry execution apparatus 20, on the basis of the control rate determined in accordance with the load condition of the central management/control apparatus 10, and the inquiry execution apparatus 20 is notified by means of an announcement or the like that control has been enforced on servicing requests. Control based on control rate means that, when the control rate is 10%, for example, 90% of all inquiries will be accepted but the remaining 10% will be rejected.

Control Process 2

Control is performed by rejecting inquiries from the inquiry execution apparatus 20 on the basis of the control rate determined in accordance with the load condition of the central management/control apparatus 10. In this control process, the inquiry execution apparatus 20 is not notified of the rejection.

Control Process 3

The central management/control apparatus 10 notifies the inquiry execution apparatus 20 of the control rate determined in accordance with the load condition of the central management/control apparatus 10, and the inquiry execution apparatus 20 controls inquiries to be sent to the central management/control apparatus 10 on the basis of the control rate thus notified.

Control Process 4

Control is performing by combining the control process 1, control process 2, and control process 3 in various ways in accordance with the condition of the load.

For example, when the control process 1 is combined with the control process 2, $\alpha\%$ of all inquiries are rejected with a notification of rejection, $\beta\%$ are rejected without any notification, and $\gamma\% (=100-\alpha-\beta)$ are accepted.

Of the control processes 1 to 3, the control process 1 imposes the heaviest load on the central management/control apparatus 10, since the central management/control apparatus 10 has to decide as to whether to accept or reject an inquiry, and has to issue a notification of rejection. Accordingly, as the number of inquiry rejections increases, the amount of processing involved increases, resulting in a further reduction in the number of inquiries that can be accepted. In the case of the control process 3, the load of the central management/control apparatus 10 is the lightest since the control processing is left to the inquiry execution apparatus 20. The control process 2 comes intermediate between the control process 1 and control process 3. Therefore, one of the control processes 1 to 4 is selected depending on the condition of the load, and when the control process 4 is selected, a decision is made as to which control process should be combined with which. This decision may be made beforehand by the administrator or may be automatically made by the central management/control apparatus 10. The control section 15a carries out the control process selected from among these control processes.

The various kinds of service control data maintained in the data base 1 include:

(i) credit card service, (ii) alternate billing service, (iii) toll-free telephone service, (iv) virtual private network service, and (v) number portability.

In the thus constructed system, when an inquiry is made by the #1 inquiry execution apparatus 20 to the central management/control apparatus 10, the monitoring section 14a of the load monitor/control section 14 in the central management/control apparatus 10 determines the control level on the basis of the various kinds of load information data, and notifies the control initiation section 14b. The control initiation section 14b refers to the control rate table 14c to obtain the control rate corresponding to the control level in the selected control process, and notifies the load processing section 15.

The control section 15a of the load processing section 15 returns a response to the requesting #1 inquiry execution apparatus 20, and then initiates the control process, 1 to 4, based on the selected control process and the control rate.

FIG. 3 is a diagram showing how the control level is determined according to the variation of load in the load monitor/control section 14 of the present invention. The ordinate represents the load or utilization of the central management/control apparatus 10, plotting the upper limit values (X1, Y1, Z1) and lower limit values (X2, Y2, Z2) of the various kinds of load information data. The abscissa represents the time. If the situation that satisfies the conditions for activation of the control process persists for more than a predetermined period of time, the control rate is raised each time the predetermined period elapses. For example, if the upper limit is exceeded at time t1, the control section 15a initiates control of level 1.

If the upper limit is still exceeded at time t2 after the elapse of the predetermined period of time, the control level is raised from level 1 to level 2. If the upper limit is still exceeded at time t3, the control section 15a further raises the control level to level 3. The effect of the control has now begun to show, and at time t4, the load or utilization drops below the upper limit but still above the lower limit, so that the level 3 is maintained.

Next, at time t5, the effect of the control is such that the load or utilization drops below the lower limit. In this case, the control section 15a lowers the control rate to level 2. The load or utilization further drops until time t6, when the control section 15a further lowers the control level to level 1.

In this way, in the present invention, when the load exceeds the upper limit, control is enforced and the control is tightened progressively; after that, when the load drops below the lower limit, control is relaxed progressively. When a plurality of variables are used to indicate the load, as described earlier, if any one of the variables exceeds its upper limit value, it is decided that the load has exceeded the upper limit, and if all the variables are below their respective lower limit values, it is decided that the load is below the lower limit. Rather than using the upper and lower limits, a single control-activation value may be used, and the above control rate decision algorithm may be applied by deciding that the load has exceeded the upper limit if the load variable exceeds that value, and deciding that the load is below the lower limit if the load variable has dropped below that value.

As described above, according to the first example of the invention, when the central management/control apparatus 10 becomes overloaded because of too many inquiries from the inquiry execution apparatus 20 to the central management/control apparatus 10, or other causes, the control processes 1 to 4 are carried out based on predetermined control criteria, to avoid or prevent overload. This provides effective overload control, as detailed below.

(i) The simplicity of the condition decision logic for calculating an effective control rate helps to reduce the processing load when performing control.

(ii) Since the control rate appropriate to the duration of an overload condition can be set in a stepwise manner, the possibility of excessive control is eliminated, serving to improve the quality of service.

(iii) The ability to set the control rate appropriate to the duration of an overload condition in a stepwise manner also ensures smooth control operations, and a maximum and effective use can be made of the system performance of the central management/control apparatus 10.

(iv) Overload control works effectively over the entire network, regardless of the size of the network.

In the above-described first example, the operation of the central management/control apparatus 10 is controlled by a service management system (not shown), a dedicated maintenance operation unit in the network. Further, the operation of the inquiry execution apparatus 20 is controlled by a terminal (not shown) connected thereto for maintenance operation. The maintenance operation unit or the terminal may also be used to provide the following functions.

(i) To display the current control status, including detailed information of the control (such as the control level, the cause that triggered the control, the extent affected by the control, etc.) at the request of the administrator.

(ii) To display only necessary information items, designated by the administrator, from the detailed information of the control (such as the control level, the cause that triggered the control, the extent affected by the control, etc.).

It is desirable that a subscriber who made a call request for service from an intelligent network but whose call was rejected because of the enforcement of load control should be notified accordingly by an announcement or other means so that the subscriber can recognize the situation as being caused by congestion.

Furthermore, in the first example, if provisions are made to allow the administrator to set, alter, and display the upper and lower limits for each of the control activation conditions, the control process can be carried out quickly and efficiently.

Likewise, if provisions are made to allow the administrator to set, alter, and display the valid/invalid setting of each of the control activation conditions, the control process can be carried out quickly and efficiently.

Moreover, when control levels are set for each of the control processes, if provisions are made to allow the administrator to set, alter, and display the control rate for each of the control levels, the control process can be carried out quickly and efficiently.

Furthermore, if provisions are made so that the administrator can make settings as to whether or not the administrator should be automatically notified of the enforcement of control at the initiation of the control, and whether or not the administrator should be automatically notified of the termination of control at the termination of the control, and can change and display the setting status, the control process can be carried out quickly and efficiently.

When settings are made so that the control status, including detailed information of the control, can be automatically indicated to the administrator, if provisions are made so that the administrator can make a setting as to which item of the detailed control information should be automatically indicated, and can change and display the setting status, the control process can be carried out quickly and efficiently.

Likewise, when settings are made so that any change in the control status, as it occurs during the control process, can be automatically indicated to the administrator, if provisions are made so that the administrator can make a setting as to whether or not any change in the control status should be automatically indicated every time such a change occurs, and can change and display the setting status, the control process can be carried out quickly and efficiently.

FIG. 4 is a block diagram showing the configuration of a second example of the present invention. The same parts as those shown in FIG. 1 are designated by the same reference numerals. In FIG. 4 and subsequent figures, the central office exchange, etc. connected to the inquiry execution apparatus 20 are not shown. In this example, service control data are classified into different data bases according to the category of service, and when the central management/control apparatus 10 becomes overloaded because of too many calls for a certain service, control is automatically enforced only on calls for that service, but not enforced on calls for other services. For example, when the central management/control apparatus 10 becomes overloaded with too many calls for toll-free telephone service, control is enforced only on calls for toll-free telephone service.

In the figure, the data base 1 is divided into different service categories, 1 to n, for different services. The data base 1 contains an inquiry request count table 1a for storing the number of inquiry requests for each service category, and a service-by-service control activation value table 1b where a control activation value for determining the number of requests per unit time at which control is just initiated, is stored for each service category.

When an inquiry from the inquiry execution apparatus 20 arrives at the central management/control apparatus 10, a service control section 16, which is provided in the central management/control apparatus 10, accesses the data base 1 in response to the inquiry, references the requested service, and implements the service according to the search result. At the same time, the service control section 16 increments the count at the corresponding position on the inquiry request count table 1a each time an inquiry arrives. The monitoring section 14a in the load monitor/control section 14 repeats the following process in a prescribed cycle.

(i) Compare the inquiry request count with the service-by-service control activation value fixed by the system or preset by the administrator in the service-by-service control activation value table 1b for the requested service.

(ii) If the inquiry request count is greater than the control activation value, enforce control on that service with the control being tightened progressively, and if it is less than the control activation value, determine the control level so that the control is lifted in a progressive manner.

(iii) Clear all inquiry request counts to prepare for the next cycle of processing.

The service-by-service control activation value can also be altered by the administrator. This makes it possible to quickly cope with the situation according to the overload condition of the central management/control apparatus 10.

Using the control level output from the monitoring section 14a, the control initiation section 14b determines the control rate corresponding to the control level by reference to the control rate table 14c. In the load processing section 15, the control section 15a carries out one of the control processes 1 to 4 only on the service designated as a control target. For example, in the case of the control process 1, inquiries are controlled based on the control rate, and the requesting inquiry execution apparatus 20 is notified of the enforcement of the control. In the case of the control process 2, inquiries are controlled based on the control rate, but no notification is issued. In the case of the control process 3, the requesting inquiry execution apparatus 20 is notified of the control rate and the applicable service, based on which the control execution section 21 in the notified inquiry execution apparatus 20 controls the inquiries to the central management/control apparatus 10 in accordance with the control rate only for the applicable service.

In cases where it is required to notify the administrator of the cause that triggered the control process, the load processing section 15 notifies the administrator of the control level, etc. for the applicable service by means of an alarm message and the like. The control activation values in the service-by-service control activation value table 1b can be altered by the administrator. In this way, it becomes possible to quickly cope with the situation in response to load variations.

In the description of the above and subsequent examples, to determine the control rate for each division of classification the number of inquiry requests per unit time is compared with the control activation value for each division of classification, to determine the control level. Alternatively, instead of a single control activation value, upper and lower limit values may be used, as in the first example. Further, instead of counting the number of inquiry requests per unit time for each division of classification, or in combination with such counting, the utilization of shared resources and/or the response time for each division of classification may be used as variables to indicate the load.

Figure 5:
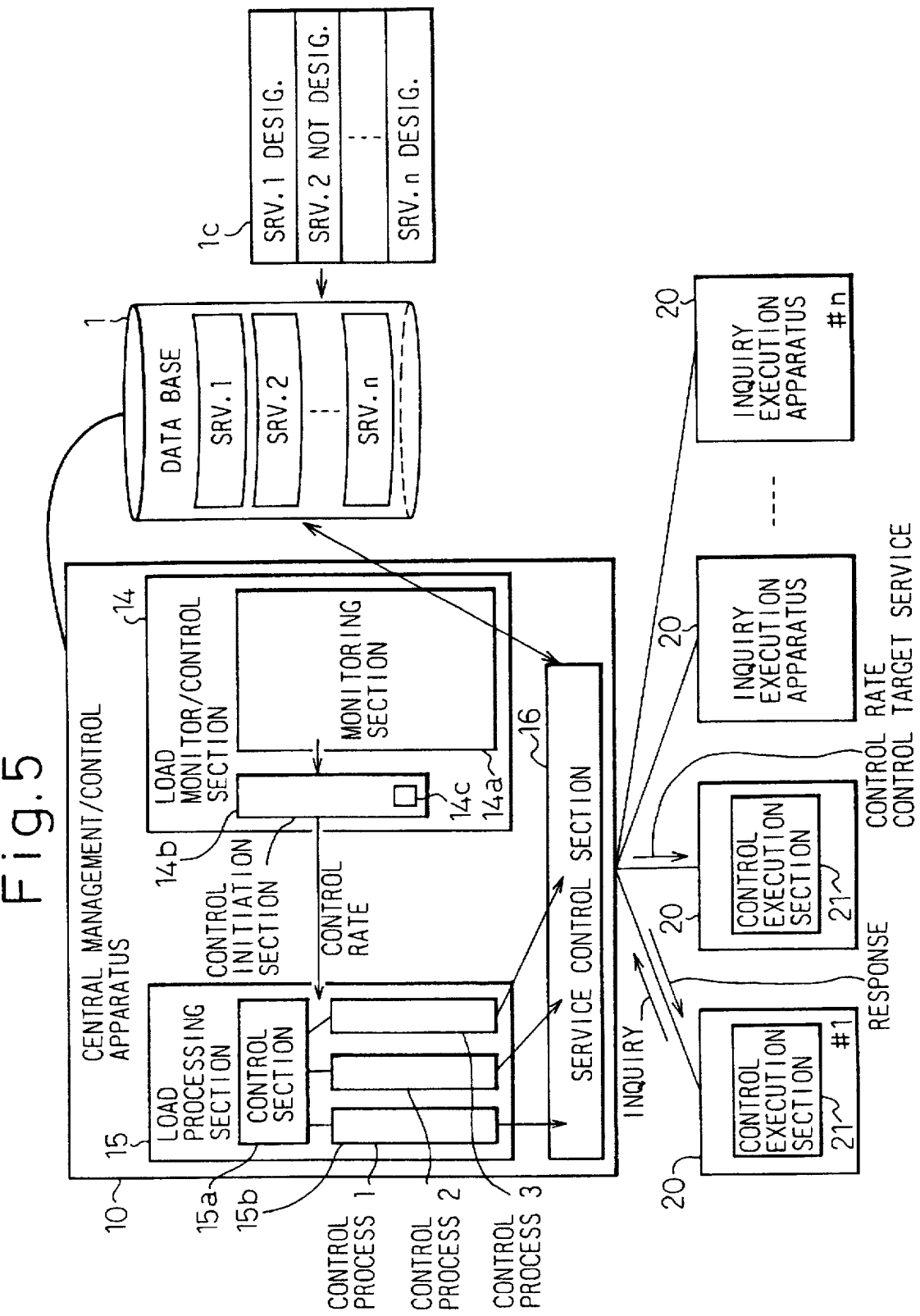
FIG. 5 is a block diagram showing a third example of the present invention.

FIG. 5 is a block diagram showing the configuration of a third example of the present invention. The same parts as those shown in FIG. 4 are designated by the same reference numerals. In this example, service control data are classified into different data bases according to the category of service, and control is enforced only on a service expected to cause overload, but not enforced on the other services; in that case, only the service which is expected to cause overload can be predesignated by the service management system as a control target. For example, when a large number of calls are expected for toll-free telephone service but not so many for other services, the target of control may be limited to the toll-free telephone service.

The data base 1 is divided into different service categories, 1 to n, for different services, as in the case of FIG. 4, and contains a control designation table 1c which indicates the control designation status of each service. In response to an inquiry from the inquiry execution apparatus 20, the service control section 16 accesses the data base 1, references the requested service, and implements the service according to the search result. The monitoring section 14a calculates and/or accepts the various kinds of load information data, as previously described, and determines the control level in the same manner as already described.

Using the control level output from the monitoring section 14a, the control initiation section 14b determines the control rate corresponding to the control level by reference to the control rate table 14c. The load processing section 15 identifies the control designation status of data by reference to the control designation table 1c, and carries out one of the control processes 1 to 4 only on the control-designated service. For example, in the case of the control process 1, inquiries are controlled based on the control rate, and the requesting inquiry execution apparatus 20 is notified of the enforcement of the control. In the case of the control process 2, inquiries are controlled based on the control rate, but no notification is issued. In the case of the control process 3, the requesting inquiry execution apparatus 20 is notified of the control rate and the applicable service, based on which the control execution section 21 in the notified inquiry execution apparatus 20 controls the inquiries to the central management/control apparatus 10 in accordance with the control rate only for the applicable service.

In cases where it is required to notify the administrator of the cause that triggered the control process, the load processing section 15 notifies the administrator of the control level, etc. for the applicable service by means of an alarm message and the like. The service-by-service control designation data values in the control designation table 1c can be altered by the administrator. In this way, it becomes possible to quickly cope with the situation in response to load variations.

Figure 6:
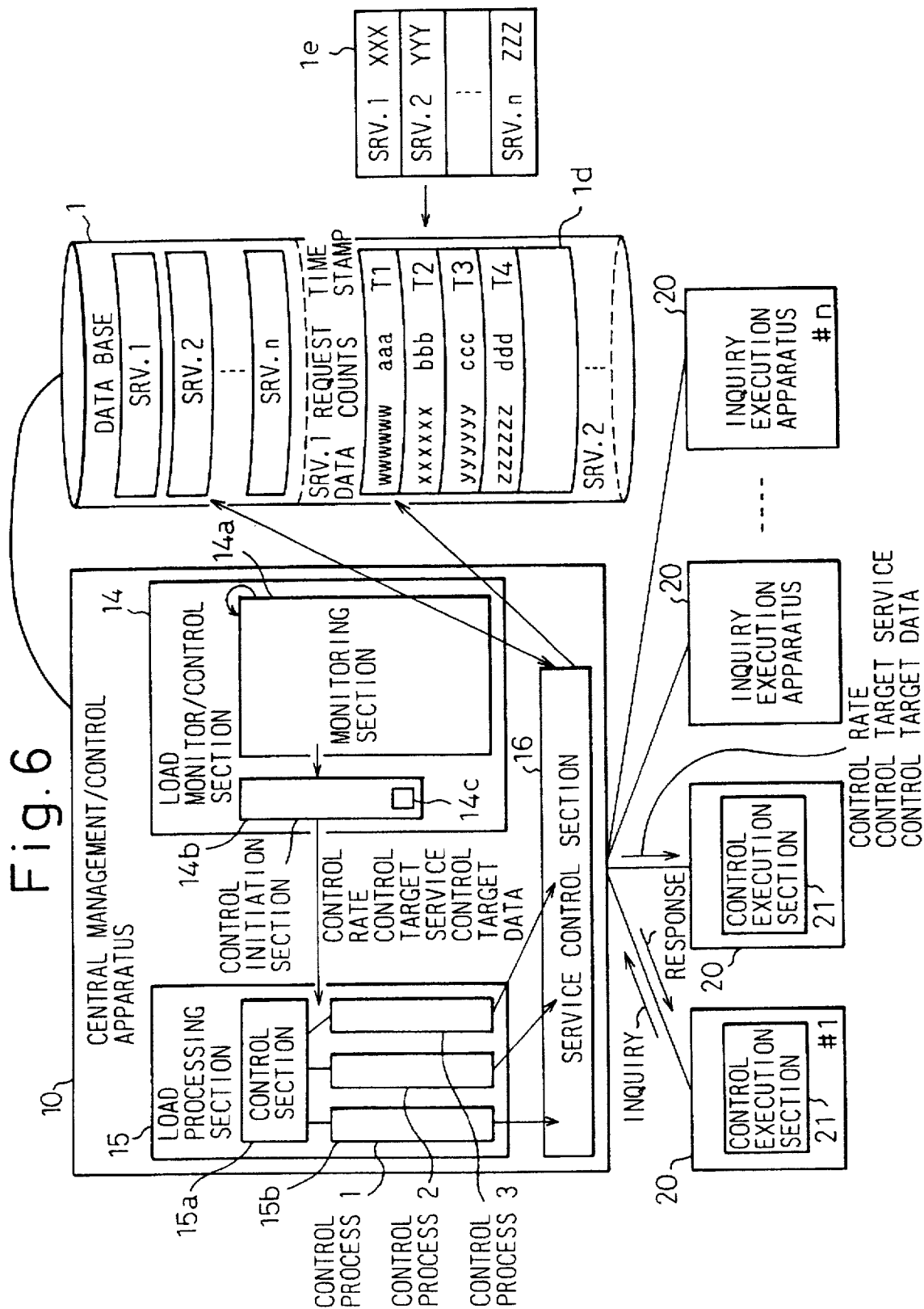
FIG. 6 is a block diagram showing a fourth example of the present invention.

FIG. 6 is a block diagram showing the configuration of a fourth example of the present invention. The same parts as those shown in FIG. 5 are designated by the same reference numerals. In this example, service control data are classified into different data bases according to the category of service, and when the central management/control apparatus 10 becomes overloaded because of too many calls for a particular data item (telephone number) in a certain service, control is automatically enforced on calls to that telephone number, but not enforced on calls to other telephone numbers or calls for other services. For example, when the central management/control apparatus becomes overloaded with too many calls to a particular telephone number in the toll-free telephone service, control is enforced only on toll-free calls to that telephone number.

The data base 1 is divided into different service categories, 1 to n, for different services, as in the case of FIG. 5. Furthermore, the data base 1 contains a data-by-data inquiry request count table 1d for storing the number of inquiry requests for each particular data item (telephone number) in each service category, and a control activation reference value table 1e for storing data-by-data control activation values that determine whether to activate control for each particular data item in the service category.

In response to an inquiry from the inquiry execution apparatus 20, the service control section 16 accesses the data base 1, references the requested service, and implements the service according to the search result. Further, the service control section 16 searches through the data in the data-by-data inquiry request count table 1d in response to the inquiry. When the requested data is found in the inquiry request count table 1d, its time stamp (data indicating the time when the last event took place) is checked, and if the time stamp is older than the current time by more than a predetermined time, the request count is initialized; otherwise, the request count is incremented. If the requested data was not found in the inquiry request count table 1d, that data is added to the table, and its request count is set to an initial value. When the request count is changed, the time stamp will be updated accordingly.

The monitoring section 14a repeats the following process in a prescribed cycle.

(i) Check all data items in the data-by-data inquiry request count table 1d.

(ii) Delete the applicable data from the table if the time stamp is older than the current time by more than a predetermined time.

(iii) If the time stamp is not older than the current time by more than the predetermined time, compare the request count with the data-by-data control activation value fixed by the system or preset by the administrator in the control activation value table 1e.

(iv) If the request count is greater than the control activation value, enforce control on the applicable data in the requested service with the control being tightened progressively, and if it is less than the control activation value, determine the control level so that the control is lifted in a progressive manner.

(v) Clear all request counts to prepare for the next cycle of processing.

Using the control level output from the monitoring section 14a, the control initiation section 14b determines the control rate corresponding to the control level by reference to the control rate table 14c. The load processing section 15 carries out one of the control processes 1 to 4 only on the applicable data in the designated service. For example, in the case of the control process 1, inquiries are controlled based on the control rate, and the requesting inquiry execution apparatus 20 is notified of the enforcement of the control. In the case of the control process 2, inquiries are controlled based on the control rate, but no notification is issued. In the case of the control process 3, the requesting inquiry execution apparatus 20 is notified of the control rate and the applicable data in the designated service, based on which the control execution section 21 in the notified inquiry execution apparatus 20 controls the inquiries to the central management/control apparatus 10 in accordance with the control rate only for the applicable data in the designated service.

In cases where it is required to notify the administrator of the cause that triggered the control process, the load processing section 15 notifies the administrator of the control level, etc. for the designated service by means of an alarm message and the like. The data-by-data control activation values in the control activation value table 1e can be altered by the administrator. In this way, it becomes possible to quickly cope with the situation in response to load variations.

Figure 7:
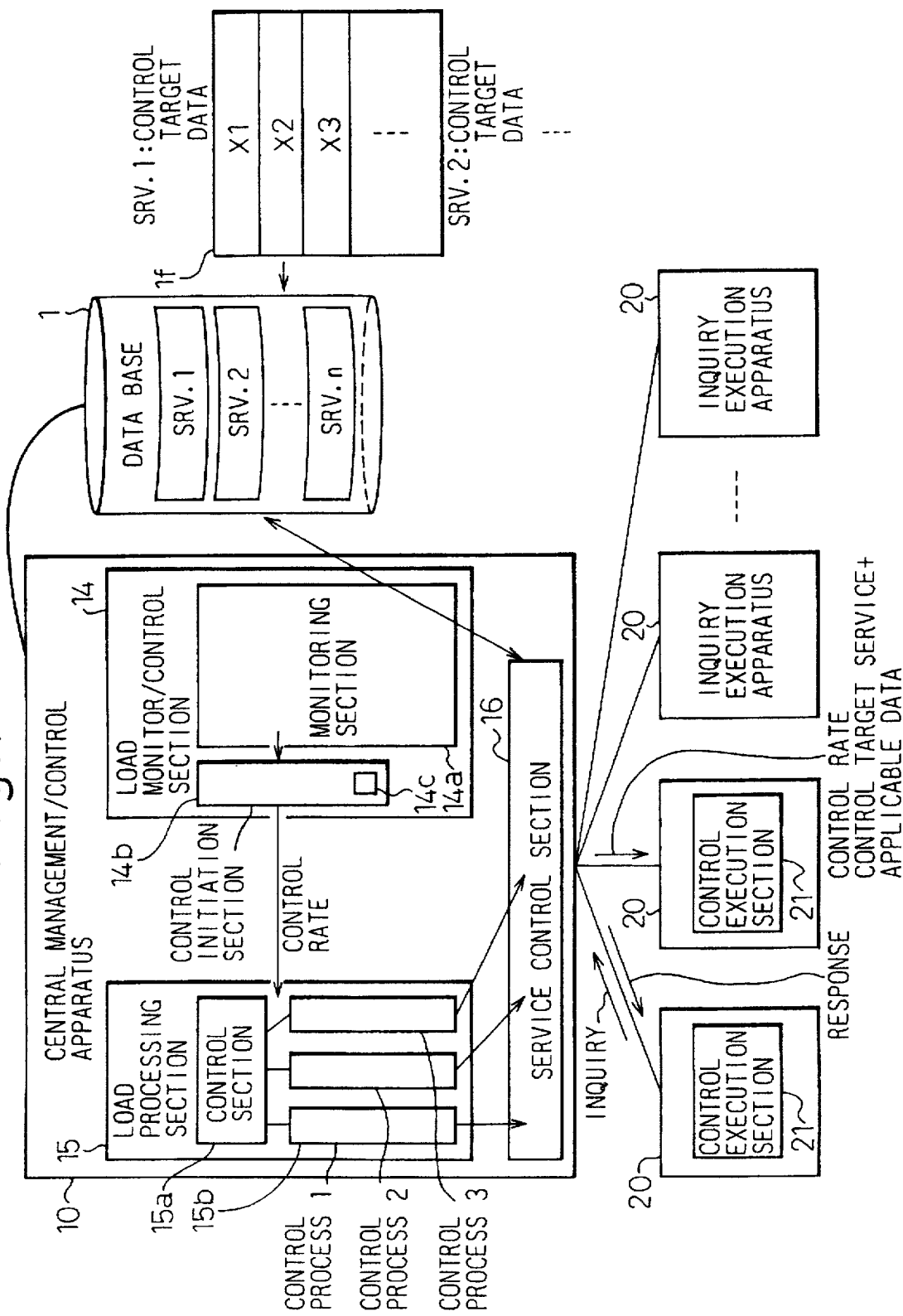
FIG. 7 is a block diagram showing a fifth example of the present invention.

FIG. 7 is a block diagram showing the configuration of a fifth example of the present invention. The same parts as those shown in FIG. 6 are designated by the same reference numerals. In this example, data are classified into different data bases according to the category of service; in that case, when a particular data item (telephone number) in a particular service category is expected to cause overload, that data item can be predesignated by the service management system as a control target so that control will be enforced only on calls to that particular data item (telephone number), but not enforced on calls to other telephone numbers or calls for other services.

For example, when a large number of calls are expected for a particular telephone number in the toll-free telephone service but not so many for other telephone numbers or other services, the target of control is restricted in advance to that telephone number in the toll-free telephone service. The data base 1 is divided into different service categories, 1 to n, for different services, as in the case of FIG. 6, and contains a control target data table 1f which maintains records of data designated as the target of control for each service.

In response to an inquiry from the inquiry execution apparatus 20, the service control section 16 accesses the data base 1, references the requested service, and implements the service according to the search result. The monitoring section 14a calculates and/or accepts the various kinds of load information data, as previously described, and determines the control level in the same manner as already described. Using the control level output from the monitoring section 14a, the control initiation section 14b determines the control rate corresponding to the control level by reference to the control rate table 14c.

The load processing section 15 references the control target data table 1f, and carries out one of the control processes 1 to 4 only on the data designated as the target of control. For example, in the case of the control process 1, inquiries are controlled based on the control rate, and the requesting inquiry execution apparatus 20 is notified of the enforcement of the control. In the case of the control process 2, inquiries are controlled based on the control rate, but no notification is issued. In the case of the control process 3, the requesting inquiry execution apparatus 20 is notified of the control rate, the designated service, and the control target data, based on which the control execution section 21 in the notified inquiry execution apparatus 20 controls the inquiries to the central management/control apparatus 10 in accordance with the control rate only for the applicable data in the designated service.

Rather than sending the control target data to the inquiry execution apparatus 20 at control initiation, the data may be sent in advance to the inquiry execution apparatus 20. Further, in cases where it is required to notify the administrator of the cause that triggered the control process, the load processing section 15 notifies the administrator of the applicable data in the designated service, the control level, etc. by means of an alarm message and the like. The data in the control target data table 1f can be altered by the administrator. In this way, it becomes possible to quickly cope with the situation in response to load variations.

The above description of the fifth example has dealt with a case in which control is enforced only on predesignated data in the predesignated service. On the other hand, there are cases in which it is desired to pass calls to a particular number despite enforcement of the control. In such cases, that particular number should be excepted from the control, while setting other numbers as the target of control.

Figure 8:
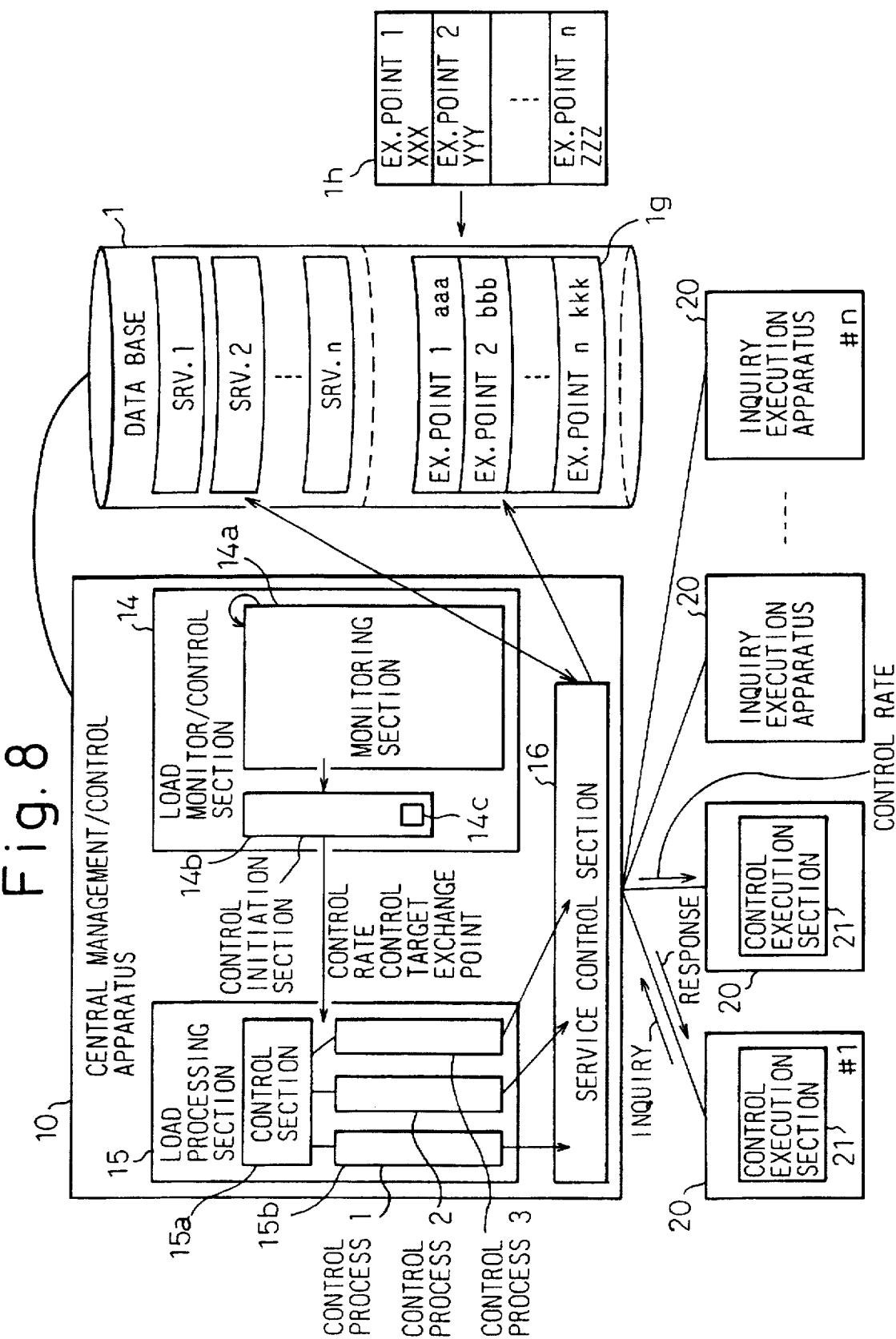
FIG. 8 is a block diagram showing a sixth example of the present invention.

FIG. 8 is a block diagram showing the configuration of a sixth example of the present invention. The same parts as those shown in FIG. 7 are designated by the same reference numerals. In this example, when the central management/control apparatus 10 becomes overloaded because of too many call requests from a particular inquiry execution apparatus 20, control is enforced only on calls from that particular inquiry execution apparatus 20, but not enforced on calls from other inquiry execution apparatus 20.

The data base 1 is divided into various service categories, 1 to n, for different services, as in the case of FIG. 7. Furthermore, the data base 1 contains an inquiry request count table 1g for storing the number of inquiry requests from each inquiry execution apparatus 20 (exchange point), and a control activation value table 1h for storing reference values for activating control for each inquiry execution apparatus 20.

In response to an inquiry from the inquiry execution apparatus 20, the service control section 16 accesses the data base 1, references the requested service, and implements the service according to the search result. At the same time, the service control section 16 increments the inquiry request count for that inquiry execution apparatus 20 in the inquiry request count table 1g.

The monitoring section 14a repeats the following process in a prescribed cycle.

(i) Compare the inquiry request count with the control activation value fixed by the system or preset by the administrator in the control activation value table 1h for the inquiry execution apparatus 20.

(ii) If the inquiry request count is greater than the control activation value, enforce control on that inquiry execution apparatus 20 with the control being tightened progressively, and if it is less than the control activation value, determine the control level so that the control is lifted in a progressive manner.

(iii) Clear all inquiry request counts in the inquiry request count table 1g to prepare for the next cycle of processing.

The control activation values for the respective inquiry execution apparatus in the control activation value table 1h can be altered by the administrator. In this way, it becomes possible to quickly cope with the situation in response to load variations.

Using the control level output from the monitoring section 14a, the control initiation section 14b determines the control rate corresponding to the control level by reference to the control rate table 14c. The load processing section 15 carries out one of the control processes 1 to 4 only on inquiries from the designated inquiry execution apparatus 20. For example, in the case of the control process 1, inquiries are controlled based on the control rate, and the applicable inquiry execution apparatus 20 is notified of the enforcement of the control. In the case of the control process 2, inquiries are controlled based on the control rate, but no notification is issued. In the case of the control process 3, the applicable inquiry execution apparatus 20 is notified of the control rate, and the control execution section 21 in the notified inquiry execution apparatus 20 controls the inquiries to the central management/control apparatus 10 in accordance with the control rate.

In cases where it is required to notify the administrator of the cause that triggered the control process, the load processing section 15 notifies the administrator of the applicable inquiry execution apparatus 20, the control level, etc. by means of an alarm message and the like.

Figure 9:
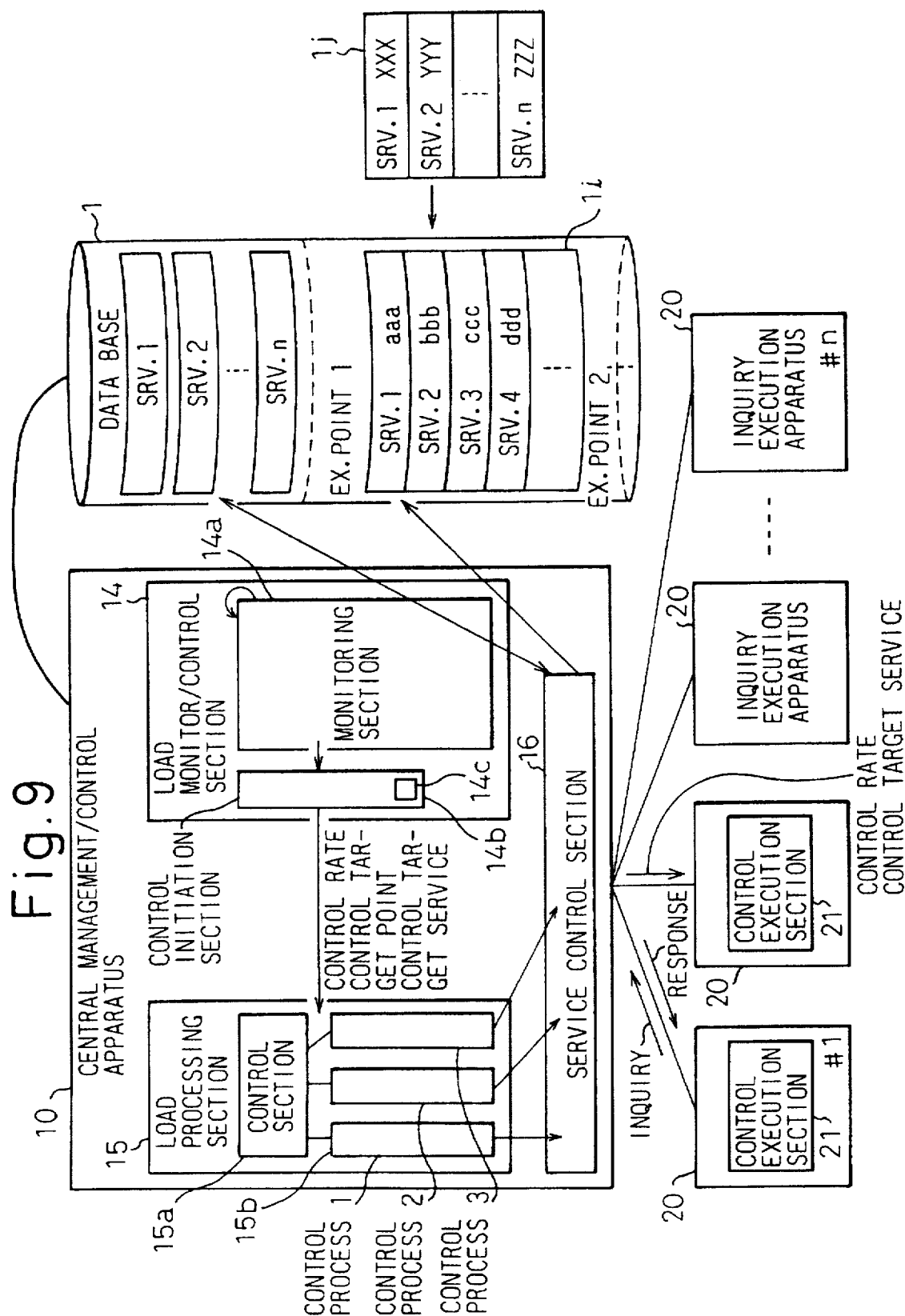
FIG. 9 is a block diagram showing a seventh example of the present invention.

FIG. 9 is a block diagram showing the configuration of a seventh example of the present invention. The same parts as those shown in FIG. 8 are designated by the same reference numerals. In the example shown in FIG. 9, when the central management/control apparatus 10 becomes overloaded because of too many call requests from a particular inquiry execution apparatus 20 for a particular service, control is automatically enforced only on calls from that particular inquiry execution apparatus 20 for that particular service, but not enforced on calls for other services or calls from other inquiry execution apparatus 20.

The data base 1 is divided into various service categories, 1 to n, for different services, as in the case of FIG. 8. Furthermore, the data base 1 contains an inquiry request count table 1i for storing the number of inquiry requests to each service category from each inquiry execution apparatus 20 (exchange point), and a control activation value table 1j for storing reference values for activating control for each service category and each inquiry execution apparatus 20.

In response to an inquiry from the inquiry execution apparatus 20, the service control section 16 accesses the data base 1, references the requested service, and implements the service according to the search result. At the same time, the service control section 16 increments the inquiry request count in the inquiry request count table 1i for the service requested by that inquiry execution apparatus 20.

The monitoring section 14a repeats the following process in a prescribed cycle.

(i) Compare the inquiry request count with the service-by-service control activation value fixed by the system or preset by the administrator in the control activation value table 1j for the inquiry execution apparatus 20.

(ii) If the inquiry request count is greater than the control activation value, enforce control on that particular category of service requested by the inquiry execution apparatus 20, with the control being tightened progressively, and if it is less than the control activation value, determine the control level so that the control is lifted in a progressive manner.

(iii) Clear all inquiry request counts in the inquiry request count table 1i to prepare for the next cycle of processing.

The service-by-service control activation values for each inquiry execution apparatus 20 in the control activation value table 1j can be altered by the administrator. In this way, it becomes possible to quickly cope with the situation in response to load variations.

Using the control level output from the monitoring section 14a, the control initiation section 14b determines the control rate corresponding to the control level by referencing the control rate table 14c. The load processing section 15 carries out one of the control processes 1 to 4 only on inquiries from the applicable inquiry execution apparatus 20 for the applicable service. For example, in the case of the control process 1, inquiries are controlled based on the control rate, and the applicable inquiry execution apparatus 20 is notified of the enforcement of the control. In the case of the control process 2, inquiries are controlled based on the control rate, but no notification is issued. In the case of the control process 3, the applicable inquiry execution apparatus 20 is notified of the control rate and the applicable service, based on which the control execution section 21 in the notified inquiry execution apparatus 20 controls the inquiries to the central management/control apparatus 10 in accordance with the control rate only for the applicable service.

In cases where it is required to notify the administrator of the cause that triggered the control process, the load processing section 15 notifies the administrator of the applicable inquiry execution apparatus 20, the control level, etc. by means of an alarm message and the like.

Figure 10:
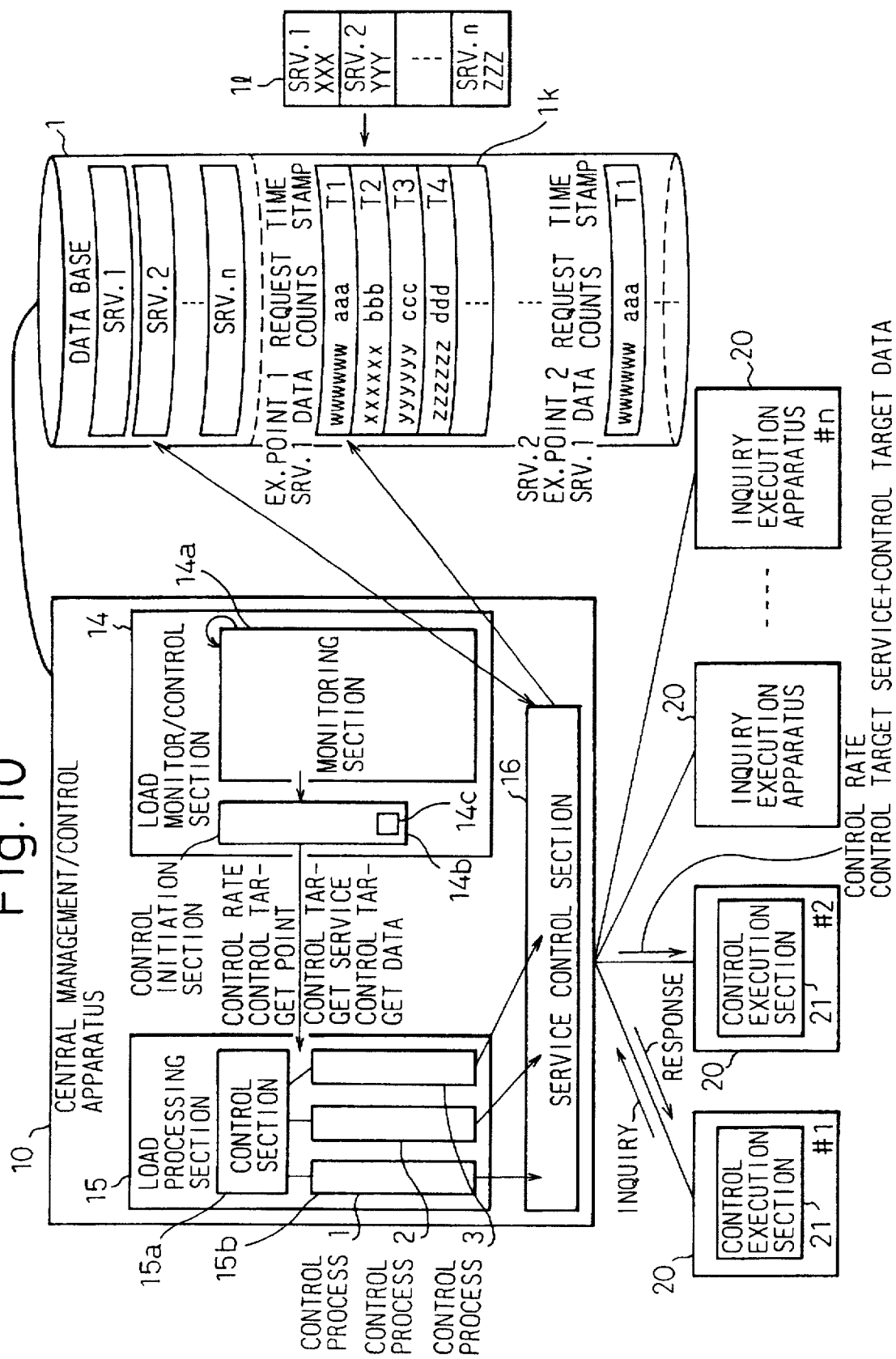
FIG. 10 is a block diagram showing an eighth example of the resent invention.

FIG. 10 is a block diagram showing the configuration of an eighth example of the present invention. The same parts as those shown in FIG. 9 are designated by the same reference numerals. In this example, when the central management/control apparatus 10 becomes overloaded because of too many call requests made by a certain inquiry execution apparatus 20 for particular data item (telephone number) in a particular service, control is automatically enforced only on calls made by that inquiry execution apparatus 20 to that particular number in that particular service, but not enforced for calls to other numbers, calls for other services, or calls from other inquiry execution apparatus 20.

The data base 1 is divided into various service categories, 1 to n, for different services, as in the case of FIG. 9. Furthermore, the data base 1 contains an inquiry request count table 1k for storing the number of inquiry requests for each particular number in each service category made by each inquiry execution apparatus 20 (exchange point), and a control activation value table 1l for storing a reference value for activating control for each particular number in each service category for each inquiry execution apparatus 20.

In response to an inquiry from the inquiry execution apparatus 20, the service control section 16 accesses the data base 1, references the requested service, and implements the service according to the search result. At the same time, the service control section 16 searches through the inquiry request count table 1k for the applicable data in the service requested by the inquiry execution apparatus 20. When the applicable data is found in the inquiry request count table 1k, its time stamp is checked and, if it is older than the current time by more than a predetermined time, the count value is initialized. If it is not older than the current time by more than the predetermined time, the inquiry request count in the inquiry request count table 1k is incremented. If the applicable data was not found in the inquiry request count table 1k, the applicable data is added to the inquiry request count table 1k, and its request count is set to an initial value. When the request count is changed, the time stamp will be updated.

The monitoring section 14a repeats the following process in a prescribed cycle.

(i) Check all data in the inquiry request count table 1k.

(ii) If the time stamp is older than the current time by more than the predetermined time, delete the applicable data from the table.

(iii) If the time stamp is not older than the current time by more than the predetermined time, compare the inquiry request count with the control activation value fixed by the system or preset by the administrator in the control activation value table 1l for that particular data in the service requested by the inquiry execution apparatus 20.

(iv) If the inquiry request count is greater than the control activation value, enforce control on that particular data in the service requested by the inquiry execution apparatus 20, with the control being tightened progressively, and if it is less than the control activation value, determine the control level so that the control is lifted in a progressive manner.

(v) Clear all inquiry request counts in the inquiry request count table 1k to prepare for the next cycle of processing.

The control activation value for each particular data in each service category in the control activation value table 1l provided for each inquiry execution apparatus 20 can be altered by administrator. In this way, it becomes possible to quickly cope with the situation in response to load variations.

Using the control level output from the monitoring section 14a, the control initiation section 14b determines the control rate corresponding to the control level by reference to the control rate table 14c. The load processing section 15 carries out one of the control processes 1 to 4 only on inquiries from the designated inquiry execution apparatus 20 for the applicable data in the applicable service. For example, in the case of the control process 1, inquiries are controlled based on the control rate, and the applicable inquiry execution apparatus 20 is notified of the activation of the control. In the case of the control process 2, inquiries are controlled based on the control rate, but no notification is issued. In the case of the control process 3, the applicable inquiry execution apparatus 20 is notified of the control rate and the applicable data in the designated service, based on which the control execution section 21 in the notified inquiry execution apparatus 20 controls the inquiries to the central management/control apparatus 10 in accordance with the control rate only for the applicable data in the designated service.

Figure 11:
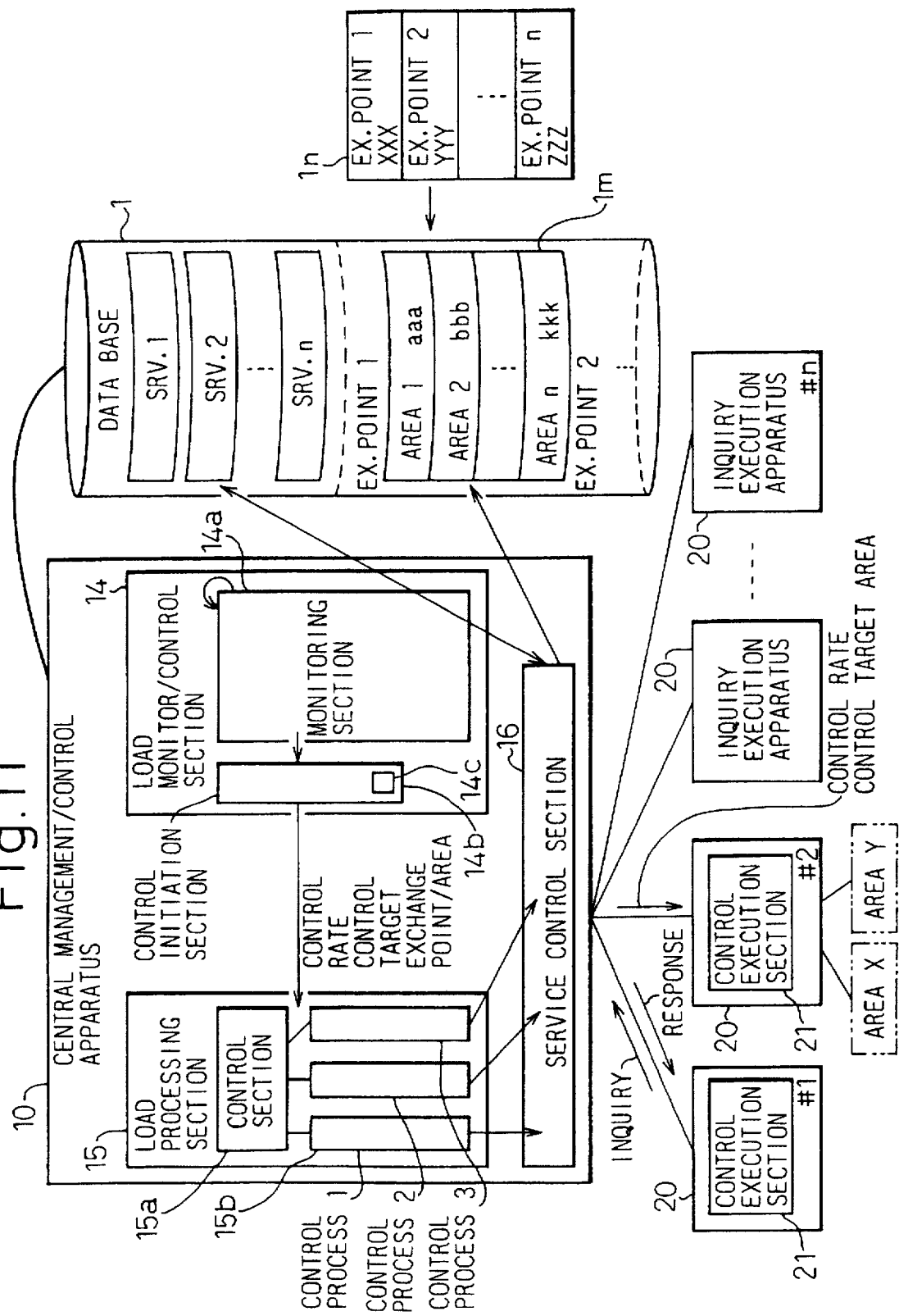
FIG. 11 is a block diagram showing a ninth example of the present invention.

FIG. 11 is a block diagram showing the configuration of a ninth example of the present invention. The same parts as those shown in FIG. 10 are designated by the same reference numerals. In this example, when the central management/control apparatus 10 becomes overloaded because of too many call requests from a particular area under control of a certain inquiry execution apparatus 20, control is automatically enforced only on calls from that particular area under control of that inquiry execution apparatus 20, but not enforced on calls from other areas or calls from other inquiry execution apparatus 20.

The data base 1 is divided into various service categories, 1 to n, for different services, as in the case of FIG. 10. Furthermore, the data base 1 contains an inquiry request count table 1m for storing the number of inquiry requests area by area from each inquiry execution apparatus 20 (exchange point), and a control activation value table 1n for storing reference values for activating control for each area and each inquiry execution apparatus 20.

In response to an inquiry from the inquiry execution apparatus 20, the service control section 16 accesses the data base 1, references the requested service, and implements the service according to the search result. At the same time, the service control section 16 increments the inquiry request count in the inquiry request count table 1m for the applicable area under control of that inquiry execution apparatus 20.

The monitoring section 14a repeats the following process in a prescribed cycle.

(i) Compare the inquiry request count, stored in the inquiry request count table 1m for the applicable area, with the control activation value fixed by the system or preset by the administrator in the control activation value table 1n for the same area.

(ii) If the inquiry request count for the applicable area is greater than the control activation value in the control activation value table 1n for the same area, enforce control on its controlling inquiry execution apparatus 20, with the control being tightened progressively, and if it is less than the control activation value, determine the control level so that the control is lifted in a progressive manner.

(iii) Next, clear all inquiry request counts stored in the inquiry request count table 1m to prepare for the next cycle of processing.

The area-by-area control activation values in the control activation value table 1n can be altered by the administrator. Further, in this example, a single value is set for all areas under control of the same inquiry execution apparatus 20, but different control activation values may be set for different areas. In this way, it becomes possible to quickly cope with the situation in response to load variations.

Using the control level output from the monitoring section 14a, the control initiation section 14b determines the control rate corresponding to the control level by reference to the control rate table 14c. The load processing section 15 carries out one of the control processes 1 to 4 only on inquiries from the applicable area made through the designated inquiry execution apparatus 20. For example, in the case of the control process 1, inquiries are controlled based on the control rate, and the applicable inquiry execution apparatus 20 is notified of the enforcement of the control. In the case of the control process 2, inquiries are controlled based on the control rate, but no notification is issued. In the case of the control process 3, the applicable inquiry execution apparatus 20 is notified of the control target area and the control rate, based on which the control execution section 21 in the notified inquiry execution apparatus 20 controls the inquiries to the central management/control apparatus 10 in accordance with the control rate for that area.

In cases where it is required to notify the administrator of the cause that triggered the control process, the load processing section 15 notifies the administrator of the control target area for the designated inquiry execution apparatus 20, the control level, etc. by means of an alarm message and the like.

Figure 12:
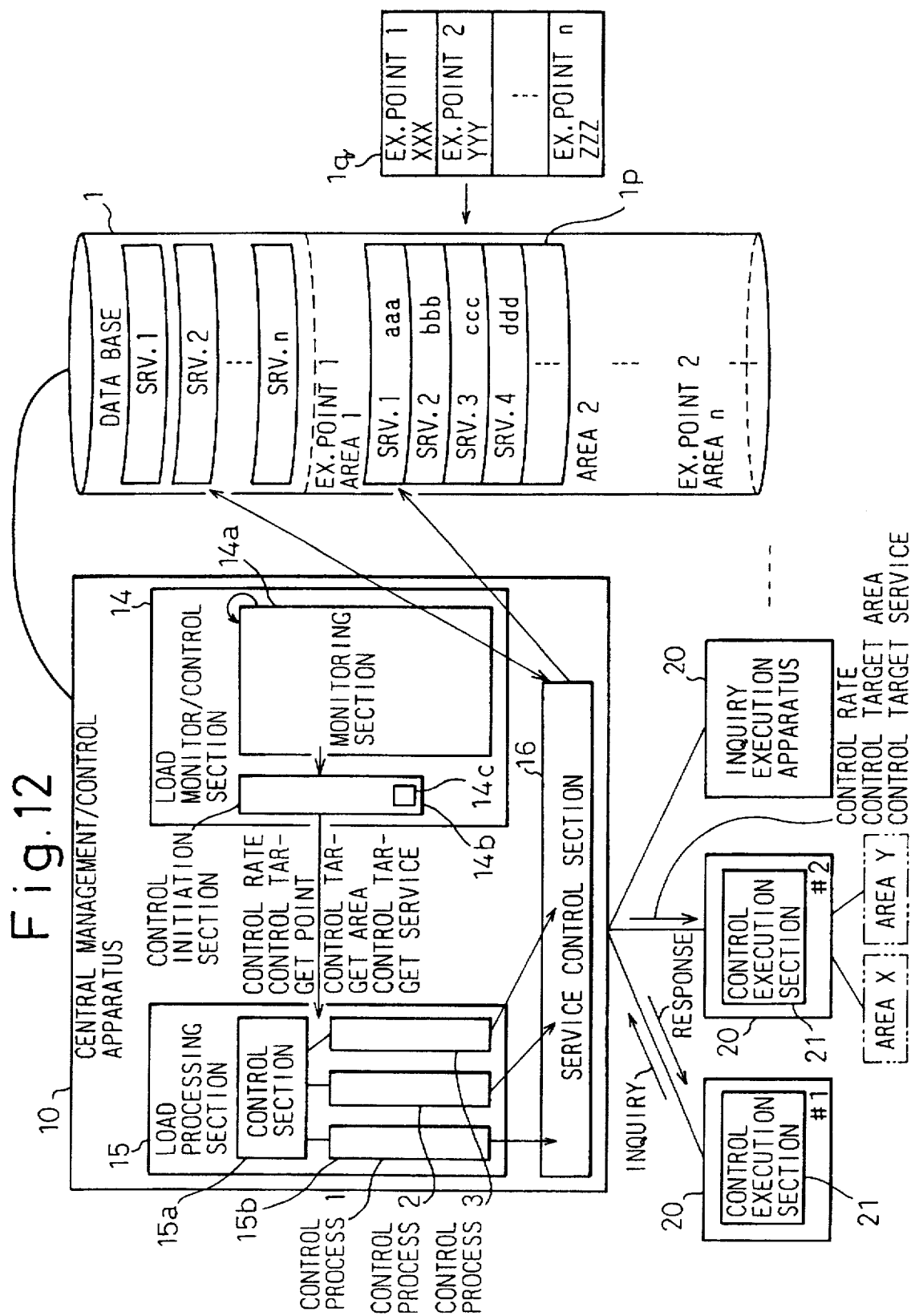
FIG. 12 is a block diagram showing a tenth example of the present invention.

FIG. 12 is a block diagram showing the configuration of a 10th example of the present invention. The same parts as those shown in FIG. 11 are designated by the same reference numerals. In this example, when the central management/control apparatus 10 becomes overloaded because of too many call requests for a particular service, from a particular area under control of a certain inquiry execution apparatus 20, control is automatically enforced only on calls for that particular service, from that particular area under control of that inquiry execution apparatus 20, but not enforced on call for other services or calls from another inquiry execution apparatus 20.

The data base 1 is divided into different service categories, 1 to n, for different services, as in the case of FIG. 11. Furthermore, the data base 1 contains an inquiry request count table 1p for storing the plurality of service categories and the number of inquiry requests per service category for each of the areas under control of each inquiry execution apparatus 20 (exchange point), and a control activation value table 1q for storing reference values for activating control for each service category and each of the areas under control of each inquiry execution apparatus 20.

In response to an inquiry from the inquiry execution apparatus 20, the service control section 16 accesses the data base 1, references the requested service, and implements the service according to the search result. At the same time, the service control section 16 increments the inquiry request count in the inquiry request count table 1p for the applicable service requested from the applicable areas under control of that inquiry execution apparatus 20.

The monitoring section 14a repeats the following process in a prescribed cycle.

(i) Compare the inquiry request count, stored in the inquiry request count table 1p for the applicable service requested from the applicable area under control of the inquiry execution apparatus 20, with the control activation value fixed by the system or preset by administrator in the control activation value table 1q for that service.

(ii) If the inquiry request count for the applicable service is greater than the control activation value, enforce control on that service requested from the applicable area under control of that inquiry execution apparatus 20, with the control being tightened progressively, and if it is less than the control activation value, determine the control level so that the control is lifted in a progressive manner.

(iii) Next, clear all inquiry request counts stored in the inquiry request count table 1p to prepare for the next cycle of processing.

The service-by-service control activation values in the control activation value table 1q can be altered by the administrator. Further, in this example, a single value is set for all areas under control of the same inquiry execution apparatus 20, but a different control activation value may be set for each service and each area. In this way, it becomes possible to quickly cope with the situation in response to load variations.

Using the control level output from the monitoring section 14a, the control initiation section 14b determines the control rate corresponding to the control level by referencing the control rate table 14c. The load processing section 15 carries out one of the control processes 1 to 4 only on inquiries for the applicable service made from the applicable area under control of the designated inquiry execution apparatus 20. For example, in the case of the control process 1, inquiries are controlled based on the control rate, and the requesting inquiry execution apparatus 20 is notified of the enforcement of the control. In the case of the control process 2, inquiries are controlled based on the control rate, but no notification is issued. In the case of the control process 3, only the designated inquiry execution apparatus 20 is notified of the applicable area, the control target service, and the control rate, based on which the control execution section 21 in the notified inquiry execution apparatus 20 controls the inquiries to the central management/control apparatus 10 in accordance with the control rate for the applicable service requested from the applicable area. In cases where it is required to notify the administrator of the cause that triggered the control process, the load processing section 15 notifies the administrator of the control target area for the designated inquiry execution apparatus 20, the control target service, the control level, etc. by means of an alarm message and the like.

Figure 13:
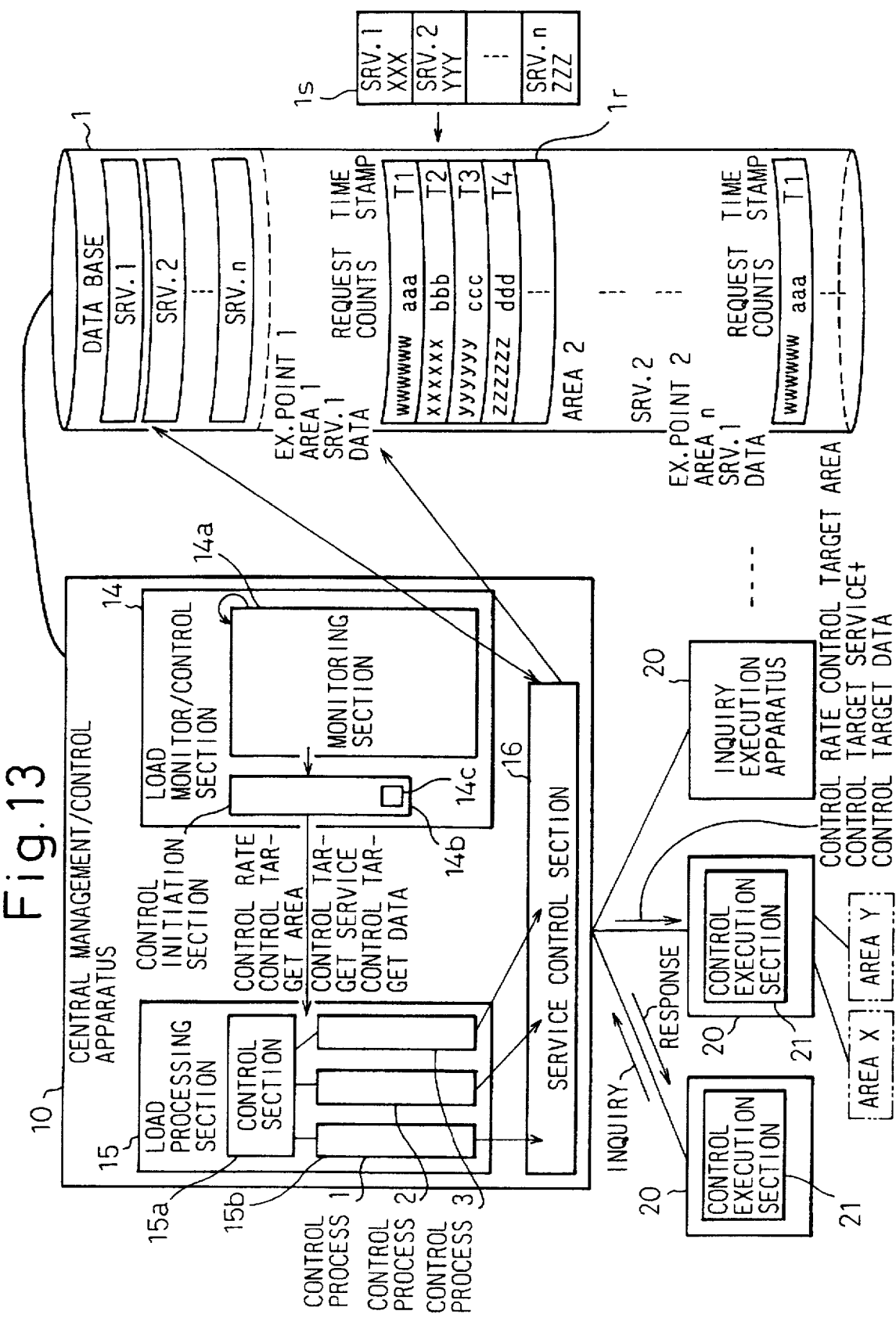
FIG. 13 is a block diagram showing an eleventh example of the present invention.

FIG. 13 is a block diagram showing the configuration of an 11th example of the present invention. The same parts as those shown in FIG. 12 are designated by the same reference numerals. In this example, when the central management/control apparatus 10 becomes overloaded because of too many call requests for particular data (telephone number) in a particular service, from a particular area under control of a certain inquiry execution apparatus 20, control is automatically enforced only on calls for that particular data in that particular service, made from that particular area under control of that inquiry execution apparatus 20, but not enforced on calls to other numbers, calls for other services, calls from other areas, or calls from other inquiry execution apparatus 20.

The data base 1 is divided into different service categories, 1 to n, for different services, as in the case of FIG. 12. Further, the data base 1 contains an inquiry request count table 1r for storing the number of inquiry requests for each particular data item in each service category, made from each of the areas under control of each inquiry execution apparatus 20 (exchange point), and a control activation value table 1s for storing a reference value for activating control for each particular data item in each service category on an area-by-area basis for each inquiry execution apparatus 20.

In response to an inquiry from the inquiry execution apparatus 20, the service control section 16 accesses the data base 1, references the requested service, and implements the service according to the search result. At the same time, the service control section 16 searches for the applicable data through the inquiry request count table 1r provided for each inquiry execution apparatus 20 on a service-by-service and an area-by-area basis. When the applicable data is found in the inquiry request count table 1r, its time stamp is checked, and if it is older than the current time by more than a predetermined time, the request count value is initialized. If it is not older than the current time by more than the predetermined time, the inquiry request count for that applicable data is incremented. If the applicable data was not found in the inquiry request count table 1r, the applicable data is added to the table 1r, and its inquiry request count is set to an initial value. When the inquiry request count is changed, the time stamp will be updated accordingly, to prepare for a succeeding inquiry.

The monitoring section 14a repeats the following process in a prescribed cycle.

(i) Check all data in the inquiry request count table 1r.

(ii) If the time stamp is older than the current time by more than the predetermined time, delete the applicable data from the table.

(iii) If the time stamp is not older than the current time by more than the predetermined time, compare the inquiry request count, stored in the table 1r for the applicable data in the applicable service requested from the applicable area under control of that inquiry execution apparatus 20, with the control activation value fixed by the system or preset by administrator in the control activation value table 1s for the same data.

(iv) If the inquiry request count is greater than the control activation value, enforce control on that data in the applicable service, requested from the applicable area, with the control being tightened progressively, and if it is less than the control activation value, determine the control level so that the control is lifted in a progressive manner.

(v) Clear all inquiry request counts to prepare for the next cycle of processing.

The control activation value for each particular data in each service category in the control activation value table 1s can be altered by the administrator. In this way, it becomes possible to quickly cope with the situation in response to load variations.

Using the control level output from the monitoring section 14a, the control initiation section 14b determines the control rate corresponding to the control level by referencing the control rate table 14c. The load processing section 15 carries out one of the control processes 1 to 4 only on inquiries for the applicable data in the applicable service, made from the applicable area under control of the designated inquiry execution apparatus 20. For example, in the case of the control process 1, inquiries are controlled based on the control rate, and the applicable inquiry execution apparatus 20 is notified of the enforcement of the control. In the case of the control process 2, inquiries are controlled based on the control rate, but no notification is issued. In the case of the control process 3, only the designated inquiry execution apparatus 20 is notified of the applicable area, the control target service, the applicable data, and the control rate, based on which the control execution section 21 in the notified inquiry execution apparatus 20 controls the inquiries to the central management/control apparatus 10 in accordance with the control rate for the applicable data in the control target service, requested from the applicable area. In case where it is required to notify the administrator of the cause that triggered the control process, the load processing section 15 notifies the administrator of the control target area for the designated inquiry execution apparatus 20, the control target area, the applicable service, the applicable data, the control level, etc. by means of an alarm message and the like.

Figure 14:
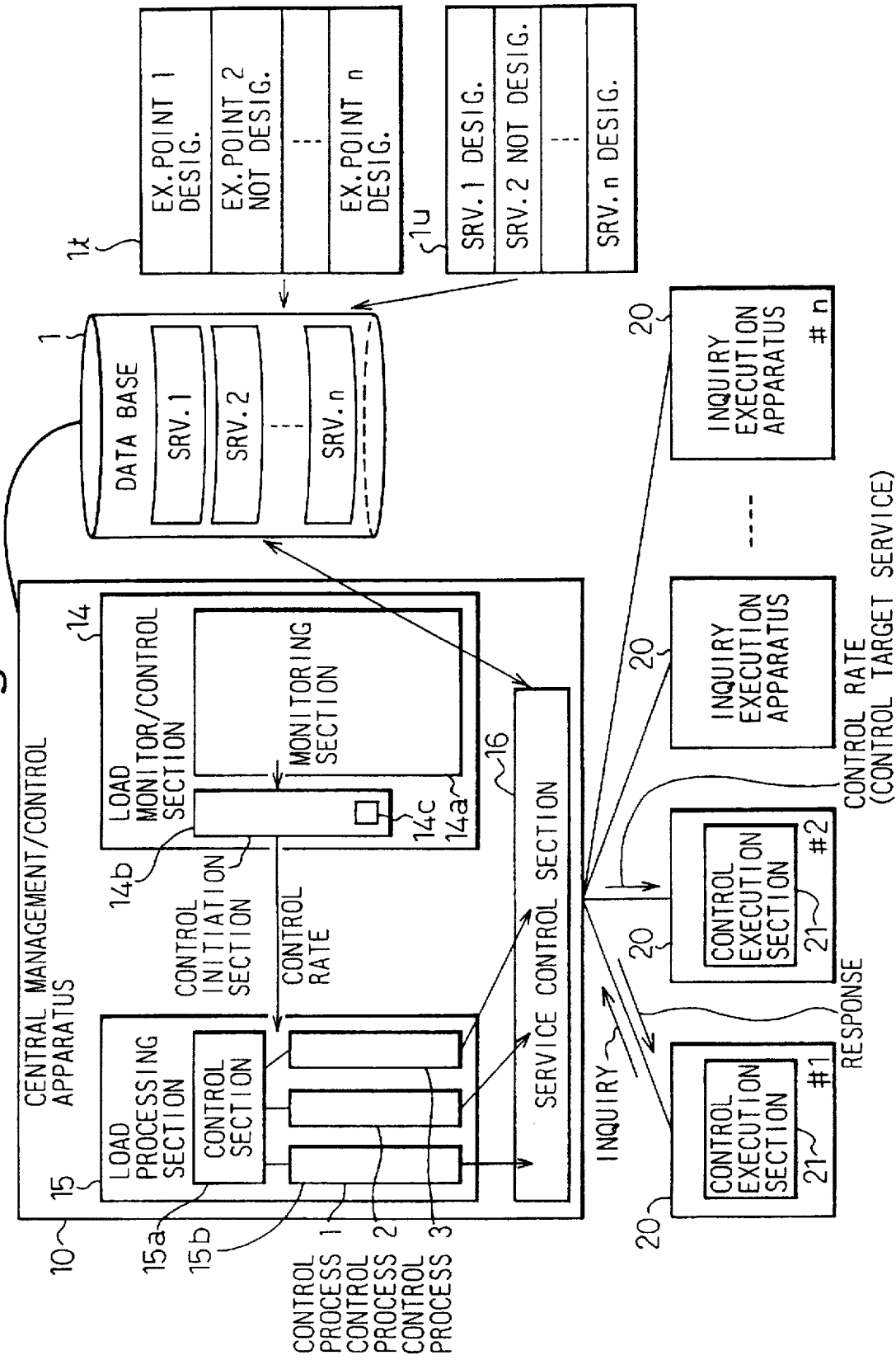
FIG. 14 is a block diagram showing a twelfth example of the present invention.

FIG. 14 is a block diagram showing the configuration of a 12th example of the present invention. The same parts as those shown in FIG. 13 are designated by the same reference numerals. In this example, when it is desired to enforce control only on calls from a specific inquiry execution apparatus 20 expected to cause overload but not enforce control on calls from another inquiry execution apparatus 20, only that specific inquiry execution apparatus 20 can be predesignated by the service management system as the target of control.

The data base 1 is divided into different service categories, 1 to n, for different services, as in the case of FIG. 13. Furthermore, the data base 1 contains a control designation data table 1t which indicates the control designation status of each inquiry execution apparatus 20 (exchange point), and a control table 1u which indicates the control designation status of each service category.

In response to an inquiry from the inquiry execution apparatus 20, the service control section 16 accesses the data base 1, references the requested service, and implements the service according to the search result. The monitoring section 14a calculates and/or accepts the various kinds of load information data, as previously described, and determines the control level in the same manner as already described. Using the control level output from the monitoring section 14a, the control initiation section 14b determines the control rate corresponding to the control level by reference to the control rate table 14c.

The load processing section 15 references the control designation table 1t for each inquiry execution apparatus 20, and carries out one of the control processes 1 to 4 only on the predesignated inquiry execution apparatus 20. For example, in the case of control process 1, inquiries are controlled based on the control rate, and the applicable inquiry execution apparatus 20 is notified of the enforcement of the control. In the case of control process 2, inquiries are controlled based on the control rate, but no notification is issued. In the case of control process 3, the applicable inquiry execution apparatus 20 is notified of the control rate, based on which the control execution section 21 in the notified inquiry execution apparatus 20 controls inquiries to the central management/control apparatus 10.

Further, in case where it is required to notify the administrator of the cause that triggered the control process, the load processing section 15 notifies the administrator of the applicable service, the control level, etc. for the applicable inquiry execution apparatus 20 by means of an alarm message and the like.

In this case, the data in the control designation data table 1t for each inquiry execution apparatus 20 can be altered by the administrator. In this way, it becomes possible to quickly cope with the situation in response to load variations.

Furthermore, in the example shown in FIG. 14, even calls from the predesignated inquiry execution apparatus 20 can be further designated or undesignated for control on a service-by-service basis. The data for implementing this are stored in the control designation table 1u. The control operation in this case is essentially the same as the earlier described control operation performed for each inquiry execution apparatus 20. In this case, the load processing section 15 applies control only to the designated service by reference to the control designation table 1u. In this way, control can be enforced only on the target service for the predesignated inquiry execution apparatus 20.

Figure 15:
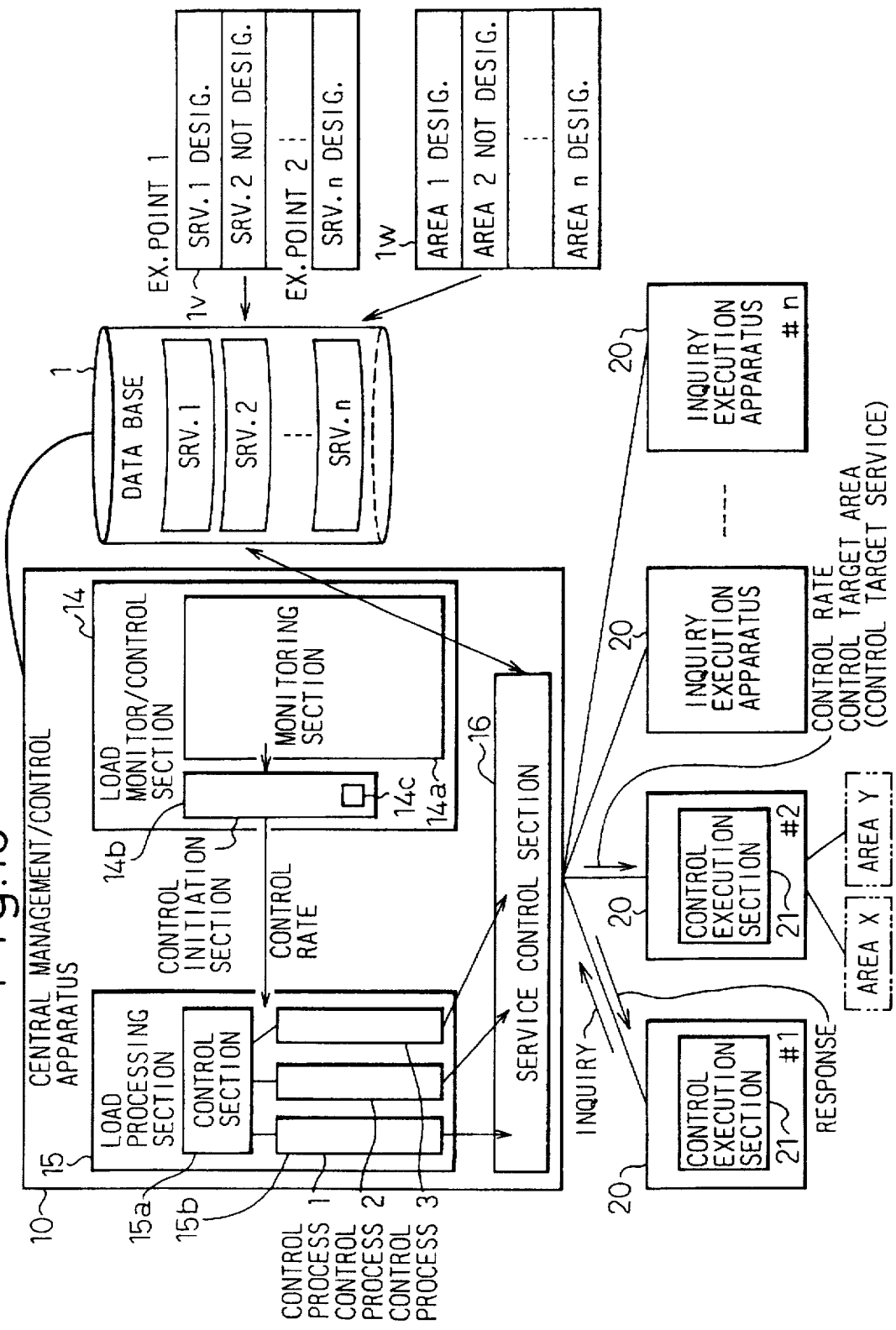
FIG. 15 is a block diagram showing a thirteenth example of the present invention.

FIG. 15 is a block diagram showing the configuration of a 13th example of the present invention. The same parts as those shown in FIG. 14 are designated by the same reference numerals. In this example, when an overload can be expected because of a large number of calls arising from a specific area under control of a certain inquiry execution apparatus 20, and when it is desired to enforce control only on calls from that specific area and not enforce control on calls from other areas or other inquiry execution apparatus 20, only that specific area under control of that inquiry execution apparatus 20 can be predesignated by the service management system as the target of control.

The data base 1 is divided into different service categories, 1 to n, for different services, as in the case of FIG. 14. Furthermore, the data base 1 contains a control designation table 1v which indicates the control designation status of each area for each inquiry execution apparatus 20 (exchange point), and a control designation table 1w which indicates the control designation status of each service for each inquiry execution apparatus 20.

In response to an inquiry from the inquiry execution apparatus 20, the service control section 16 accesses the data base 1, references the requested service, and implements the service according to the search result. The monitoring section 14a calculates and/or accepts the various kinds of load information data, as previously described, and determines the control level in the same manner as already described. Using the control level output from the monitoring section 14a, the control initiation section 14b determines the control rate corresponding to the control level by reference to the control rate table 14c. This serves to prevent the occurrence of an overload condition.

The load processing section 15 references the control designation data table 1t where the control designation status of each area is stored for each inquiry execution apparatus 20, and enforces one of the control processes 1 to 4 only on the applicable area under control of the designated inquiry execution apparatus 20.

The control designation data values in the control designation table 1v, where the control designation status of each area is stored for each exchange point, can be altered by the administrator. In this way, it becomes possible to quickly cope with the situation in response to load variations. Further, in case where it is required to notify the administrator of the cause that triggered the control process, the load processing section 15 notifies the administrator of the applicable area, control level, etc. for the applicable inquiry execution apparatus 20 by means of an alarm message and the like.

Furthermore, in the example shown in FIG. 15, by having the load processing section 15 reference the control designation table 1w for the control designation status of each service for the inquiry execution apparatus 20 designated as a control target, the control process can be performed on a service-by-service basis for the designated inquiry execution apparatus 20. The control operation in this case is essentially the same as the earlier described control operation performed on an area-by-area basis for the inquiry execution apparatus 20. In this case, the load processing section 15 applies control only to the designated service by reference to the control designation table 1w. This, in conjunction with the area-by-area control designation data values, makes it possible to enforce control only on the target service for the designated inquiry execution apparatus 20.

Further, in case where it is required to notify the administrator of the cause that triggered the control process, the load processing section 15 notifies the administrator of the applicable service, control level, etc. for the designated inquiry execution apparatus 20 by means of an alarm message and the like.

Figure 16:
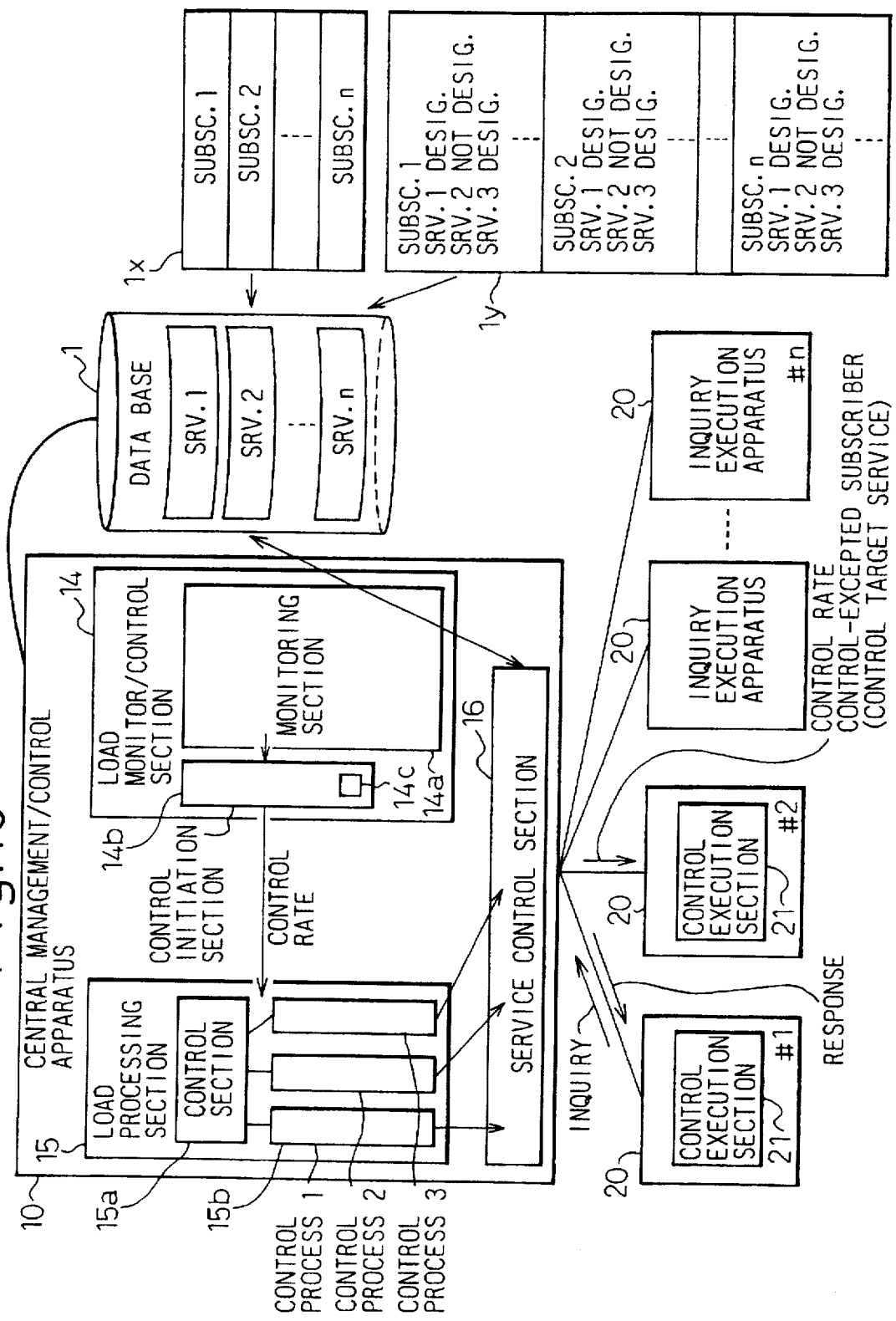
FIG. 16 is a block diagram showing a fourteenth example of the present invention.

FIG. 16 is a block diagram showing the configuration of a 14th example of the present invention. The same parts as those shown in FIG. 15 are designated by the same reference numerals. In this example, preregistered subscribers are excepted from control even when control is enforced due to overload.

The data base 1 is divided into different service categories, 1 to n, for different services, as in the case of FIG. 15. Furthermore, the data base 1 contains a control-exception table 1x or 1y for storing data on subscribers to be excepted from control. The control-exception table 1x simply stores data on subscribers excepted from control, while the control-exception table 1y contains, in addition to the data on control-excepted subscribers, control designation data for each of accessible services for each excepted subscriber.

In response to an inquiry from the inquiry execution apparatus 20, the service control section 16 accesses the data base 1, references the requested service, and implements the service according to the search result. The monitoring section 14a calculates and/or accepts the various kinds of load information data, as previously described, and determines the control level in the same manner as already described. Using the control level output from the monitoring section 14a, the control initiation section 14b determines the control rate corresponding to the control level by reference to the control rate table 14c.

The load processing section 15 references the control-exception table 1x or 1y, and enforces one of the control processes 1 to 4 on subscribers not listed on the table.

In case where it is required to notify the administrator of the cause that triggered the control process, the load processing section notifies the administrator of the applicable subscribers, the control level, etc. by means of an alarm message and the like. Further, for each of the subscribers excepted from control, control designation status can be set on a service-by-service basis, as shown in the control-exception table 1y. This makes meticulous control of the processing possible in response to load variations.

Figure 17:
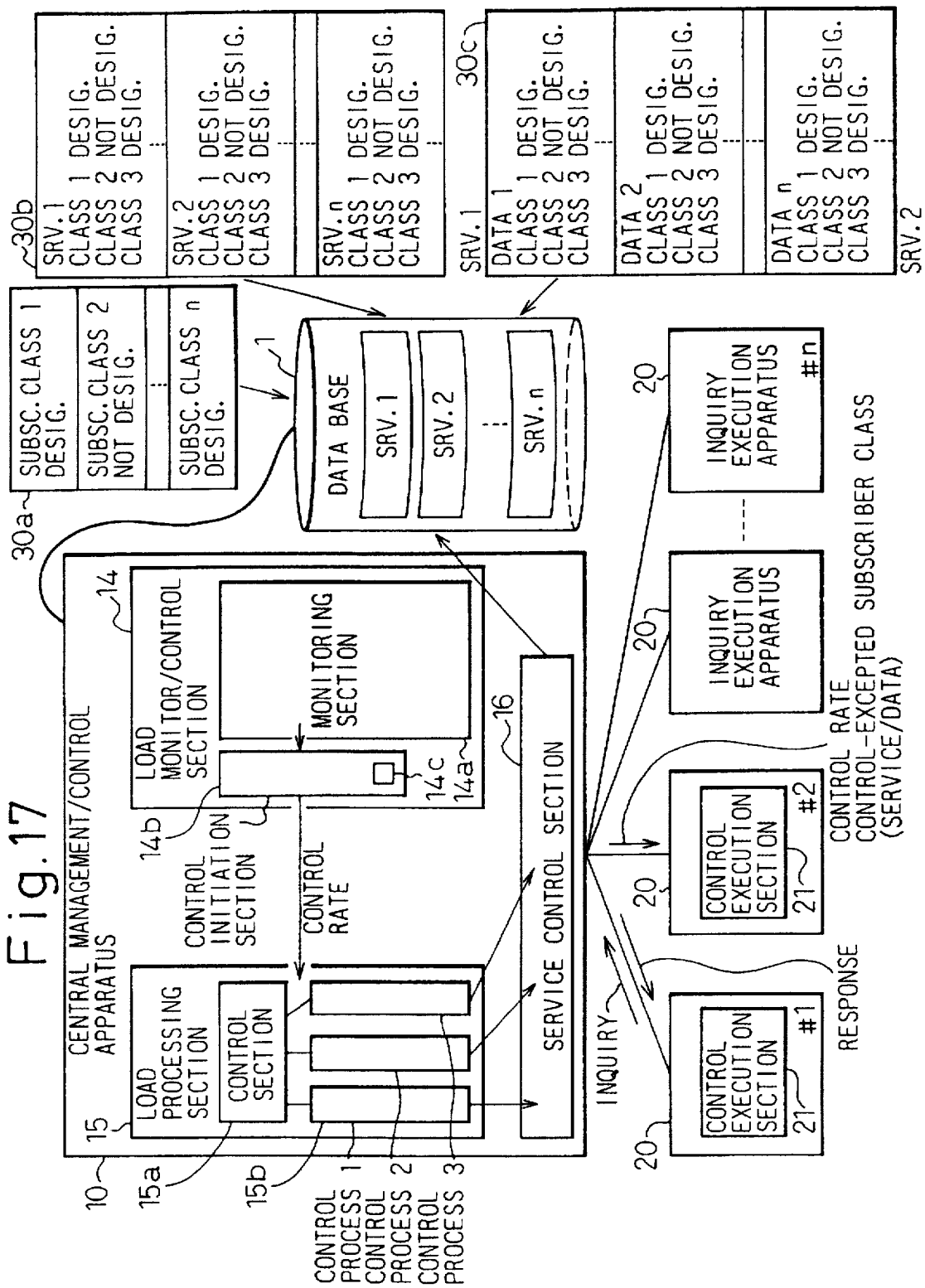
FIG. 17 is a block diagram showing a fifteenth example of the present invention.

FIG. 17 is a block diagram showing the configuration of a 15th example of the present invention. The same parts as those shown in FIG. 16 are designated by the same reference numerals. In this example, control designation status is determined according to the subscriber class (general subscribers, public telephones, test calls, etc.).

The data base 1 is divided into different service categories, 1 to n, for different services, as in the case of FIG. 16. Furthermore, the data base 1 contains a subscriber class table 30a for storing control designation status data for each subscriber class, or when there are a plurality of classes assigned under each service category, a subscriber class table 30b for storing control designation status data for each class under each service category, or when there are a plurality of classes assigned under each data category in each service category, a subscriber class table 30c for storing control designation status data for each class under each data category.

In response to an inquiry from the inquiry execution apparatus 20, the service control section 16 accesses the data base 1, references the requested service, and implements the service according to the search result. The monitoring section 14a calculates and/or accepts the various kinds of load information data, as previously described, and determines the control level in the same manner as already described. Using the control level output from the monitoring section 14a, the control initiation section 14b determines the control rate corresponding to the control level by reference to the control rate table 14c.

The load processing section 15 references the subscriber class table 30a, and enforces one of the control processes 1 to 4 only on calls from applicable subscriber classes.

In this case, the subscriber class control designation data values in the subscriber class table 30a can be altered by the administrator. Furthermore, control designation status can be set for each subscriber class under each data category in each service, as shown in the table 30c. This makes meticulous control of the processing possible in response to load variations.

FIG. 18 is a block diagram showing the configuration of a 16th example of the present invention. The same parts as those shown in FIGS. 1 and 17 are designated by the same reference numerals. In this example, access to a certain number is granted only to subscribers having numbers whose last digit is, for example, 3, in order to prevent overload. This example can be implemented in the following ways, for example.

(i) The last digit control can be freely scheduled by the administrator so that the applicable last digit can be changed according to the time of day, day of week, etc.

(ii) The applicable last digit can be changed from subscriber terminals.

(iii) In the case of (ii), only preregistered subscribers are allowed to make the change.

The data base 1 is divided into different service categories, 1 to n, for different services, as in the case of FIG. 17. Furthermore, the data base 1 contains a control table 30d for storing, for each service category, data for which the last digit control is applied, or a control table 30e for storing data, for each data category in each service category, for which the control is scheduled on a day-of-week basis.

When an inquiry is received from the inquiry execution apparatus 20, the central management/control apparatus 10 checks the control table 30d for last digit control data, and rejects all inquiries arising from calls from numbers whose last digit is not the permitted one. The last digit control data can be altered by the administrator. In this way, it becomes possible to quickly cope with the situation in response to load variations.

Alternatively, when an inquiry is received from the inquiry execution apparatus 20, the central management/control apparatus 10 checks the control table 30e based on the time and date of the call, and rejects all inquiries arising from calls from numbers whose last digit is not the permitted one. The last digit control schedule data can be altered by the administrator. In this way, it becomes possible to quickly cope with the situation in response to load variations.

In this case, subscriber terminal 3 is allowed to alter the last digit control data. It is also possible to configure the system so that only preregistered subscriber terminals are allowed to alter the control data. In this example also, when the central management/control apparatus 10 becomes overloaded, the previously described control processing, from control process 1 to control process 4, can be invoked.

FIG. 19 is a block diagram showing the configuration of a 16th example of the present invention. The same parts as those shown in FIG. 18 are designated by the same reference numerals. In this example, access to a certain number is granted only to subscribers, for example, in a certain area, in order to prevent overload.

The data base 1 is divided into different service categories, 1 to n, for different services, as in the case of FIG. 18. Furthermore, the data base 1 contains a control-exception data table 30f for storing data on numbers excepted from control on an area-by-area basis for each inquiry execution apparatus (exchange point) 20, or a control-exception data table 30f for storing control-exception data for each service accessible from the inquiry execution apparatus 20 on a day-of-week and an area-by-area basis.

When an inquiry is received from the inquiry execution apparatus 20, the central management/control apparatus 10 checks the control-exception data table 30f, and rejects all inquiries arising from calls from areas other than the permitted area. The control-exception data in the control-exception data table 30f can be altered by the administrator. In this way, it becomes possible to quickly cope with the situation in response to load variations.

Alternatively, when an inquiry is received from the inquiry execution apparatus 20, the central management/control apparatus 10 checks the control exception schedule on the control-exception data table 30g based on the time and date of the call, and rejects all inquiries arising from calls from areas other than the permitted area. The control-exception schedule data in the control-exception data table 30g can be altered by the administrator. In this way, it becomes possible to quickly cope with the situation in response to load variations. Further, subscriber terminal 3 is allowed to alter the control-exception data table 30f or 30g. It is also possible to configure the system so that only preregistered subscriber terminals are allowed to alter the data. In this example also, when the central management/control apparatus 10 becomes overloaded, the previously described control processing, from control process 1 to control process 4, can be invoked.

FIG. 20 is a block diagram showing the configuration of an 18th example of the present invention. The same parts as those shown in FIG. 19 are designated by the same reference numerals. In this example, access to a certain number is granted, for example, only to preregistered subscribers, in order to prevent overload. This example can be implemented in the following ways, for example.

(i) The subscriber limiting control is scheduled so that it can be changed according to the time of day, day of week, etc.

(ii) Alteration, addition, and deletion of permitted subscribers can be carried out from subscriber terminals.

(iii) In the case of (ii), only preregistered subscribers are allowed to perform the alteration, addition, and deletion.

The data base 1 is divided into different service categories, 1 to n, for different services, as in the case of FIG. 19. Furthermore, the data base 1 contains a control-exception data table 30h for storing data on subscribers excepted from control, or a control-exception data table 30i for storing control-exception data scheduled on a day-of-week basis.

When an inquiry is received from the inquiry execution apparatus 20, the central management/control apparatus 10 checks the control-exception data table 30h for data on subscribers excepted from call control, and when the call is to the predesignated number, rejects all inquiries arising from calls from subscribers other than the permitted subscribers. The control-exception data in the control-exception data table 30h can be altered by the administrator. In this way, it becomes possible to quickly cope with the situation in response to load variations.

Alternatively, when an inquiry is received from the inquiry execution apparatus 20, the central management/control apparatus 10 checks the control-exception schedule on the control-exception data table 30i based on the time and date of the call, and when the call is to the predesignated number, rejects all inquiries arising from calls from subscribers other than the permitted subscribers. The control-exception schedule data in the control-exception data table 30i can be altered by the administrator. In this way, it becomes possible to quickly cope with the situation in response to load variations.

In this case, subscriber terminal 3 is allowed to alter the control-exception data in the control-exception data table 30h. It is also possible to configure the system so that only preregistered subscriber terminals are allowed to alter the data. In this example also, when the central management/control apparatus 10 becomes overloaded, the previously described control process, from control process 1 to control process 4, can be invoked.

FIG. 21 is a block diagram showing the configuration of a 19th example of the present invention. The same parts as those shown in FIG. 17 are designated by the same reference numerals. In this example, provisions are made so that where calls can be classified, for example, by attributes of information, such as voice, video, and digital information, control designation status can be automatically set only for applicable attributes. This enables the load to be controlled efficiently according to the attributes.

The data base 1 is divided into different service categories, 1 to n, for different services, as in the case of FIG. 17. Furthermore, the data base 1 contains an attribute table 30j for storing attribute data for control designation, or an attribute table 30k for storing attribute data for control designation for each service category, or an attribute table 30l for storing attribute data for control designation for each data item in each service category.

In response to an inquiry from the inquiry execution apparatus 20, the service control section 16 accesses the data base 1, references the requested service, and implements the service according to the search result. The monitoring section 14a calculates and/or accepts the various kinds of load information data, as previously described, and determines the control level in the same manner as already described. Using the control level output from the monitoring section 14a, the control initiation section 14b determines the control rate corresponding to the control level by reference to the control rate table 14c.

The load processing section 15 references the attribute table 30j, and enforces one of the control processes 1 to 4 only on calls of control target attributes.

In this case, when it is required to notify the administrator of the cause that triggered the control process, the load processing section 15 notifies the administrator of the control level, attributes, etc. by means of an alarm message and the like. Here, the control target attribute data values in the attribute table 30j can be altered by the administrator. The attribute data can also be set on a service-by-service basis, as shown in the attribute table 30k. Further, the attribute data can be set for each data item in each service category, as shown in the attribute table 30l.

FIG. 22 is a block diagram showing the configuration of a 20th example of the present invention. The same parts as those shown in FIG. 21 are designated by the same reference numerals. In this example, when control is enforced due to overload, a call, even if it is the kind of call that should be rejected by the control, can be excepted from the control and connected by entering a password, for example, in response to a call-reject announcement.

This example can be practically implemented by configuring the service management system in such a way that the password function is accessible only by the administrator authorized to alter or display the password, or that the password is valid only when it is entered from predesignated subscribers, or that the password can be altered from subscriber terminals. In this way, even when a call is rejected during the enforcement of control, by entering a password the control initiation section 10 in the central management/control apparatus 10 can be made to lift control on that call, thus making it possible to accept a specific call in the case of an emergency or the like even if the call is the kind of call otherwise rejected by the control.

The data base 1 is divided into different service categories, 1 to n, for different services, as in the case of FIG. 21. Furthermore, the data base 1 contains a password table 30m for storing control-exception password data (set for each valid service), or a password table 30n for storing subscriber data valid for each password.

In response to an inquiry from the inquiry execution apparatus 20, the service control section 16 accesses the data base 1, references the requested service, and implements the service according to the search result. The monitoring section 14a calculates and/or accepts the various kinds of load information data, as previously described, and determines the control level in the same manner as already described. Using the control level output from the monitoring section 14a, the control initiation section 14b determines the control rate corresponding to the control level by reference to the control rate table 14c.

For a call for which a password was entered, the load processing section 15 references the password table 30m, and enforces one of the control processes 1 to 4 on calls other than the call for which a valid password was entered.

In this case, rather than sending the control-exception data to the inquiry execution apparatus 20 at control initiation, the data may be sent in advance to the inquiry execution apparatus 20. Further, when it is required to notify the administrator of the cause that triggered the control process, the load processing section 15 notifies the administrator of the control-exception passwords, the control level, etc. by means of an alarm message and the like.

The control-exception password data values can be altered by the administrator; in this way, it becomes possible to quickly cope with the situation in response to load variations. It is also possible to provide valid subscriber data for each password, as shown in the password table 30n. Further, the password can be made valid only when it is entered from a predesignated subscriber terminal.

We claim:

1. A load control apparatus, connected to at least one inquiry execution apparatus, for controlling a load of a central management/control apparatus by controlling inquiries issued from the inquiry execution apparatus to the central management/control apparatus responsible for processing and responding to the inquiries, comprising:

a load monitor/control section for monitoring the load of the central management/control apparatus, and for determining a variable control rate appropriate to the monitored load; and a load processing section for controlling the load by rejecting inquiries in a variable proportion in response to the control rate.

2. A load control apparatus, connected to at least one inquiry execution apparatus, for controlling a load of a central management/control apparatus by controlling inquiries issued from the inquiry execution apparatus to the central management/control apparatus responsible for processing and responding to the inquiries, comprising:

a load monitor/control section for monitoring the load of the central management/control apparatus, and for determining a control rate appropriate to the load; and a load processing section for controlling the load by rejecting inquiries in proportion to the control rate, wherein the load processing section is able to execute a control process which is selected in accordance with the load on the central management/control section from among;

a first control process in which inquiries are rejected in proportion to the control rate and every inquiry rejection is notified to the inquiry execution apparatus that issued the rejected inquiry, a second control process in which inquiries are rejected in proportion to the control rate, without issuing a rejection notification, a third control process in which the inquiry execution apparatus is instructed to control the inquiries in accordance with a proportion to the control rate, and a fourth control process in which two or more of the first, second, and third control processes are combined for execution.

3. An apparatus according to claim 2, wherein the load monitor/control section includes;

means for determining the control rate at a nonzero value when the load has exceeded a preset upper limit value, means for progressively raising the control rate when the load continues to stay above the preset upper limit value, and means for progressively lowering the control rate when the load has dropped below a preset lower limit value.

4. An apparatus according to claim 3, wherein the load monitor/control section monitors a plurality of variables indicating the load on the central management/control apparatus, and decides that the load has exceeded the upper limit value when at least one of the variables has exceeded an upper limit value of its own, while deciding that the load has dropped below the lower limit value when all of the variables have dropped below their respective lower limit values.

5. An apparatus according to claim 2, wherein;
the central management/control apparatus processes inquiries for a plurality of service categories,
the load monitor/control section monitors the load of the central management/control apparatus for each of the service categories, and determines the control rate appropriate to the load, and
the load processing section rejects inquiries in proportion to the control rate for each of the service categories.

6. An apparatus according to claim 2, wherein the load processing section rejects inquiries in accordance with the proportions based on the control rate only for a predesignated service category.

7. An apparatus according to claim 2, wherein;
the central management/control apparatus processes inquiries for a plurality of service categories,
the load monitor/control section monitors the load of the central management/control apparatus for each of the service categories and each number data therein, and determines the control rate appropriate to the load, and
the load processing section rejects inquiries in proportion to the control rate for each of the service categories and each number data therein.

8. An apparatus according to claim 2, wherein the load processing section rejects inquiries in accordance with a proportion based on the control rate only for predesignated number data in a predesignated service category.

9. An apparatus according to claim 2, wherein;
the load monitor/control section monitors the load on the central management/control apparatus for each of the inquiry execution apparatus requesting inquiries, and determines the control rate appropriate to the load, and
the load processing section rejects inquiries in proportions based on the control rate for each of the inquiry execution apparatus.

10. An apparatus according to claim 2, wherein the load processing section rejects inquiries in accordance with a proportion based on the control rate only for a predesignated inquiry execution apparatus.

11. An apparatus according to claim 2, wherein;
the central management/control apparatus processes inquiries for a plurality of service categories,
the load monitor/control section monitors the load on the central management/control apparatus for each of the service categories and each of the inquiry execution apparatus requesting inquiries, and determines the control rate appropriate to the load, and
the load processing section rejects inquiries in proportion to the control rate for each of the service categories and each of the inquiry execution apparatus.

12. An apparatus according to claim 2, wherein the load processing section rejects inquiries in accordance with a proportion based on the control rate only for a predesignated inquiry execution apparatus and a predesignated service category.

13. An apparatus according to claim 2, wherein;
the central management/control apparatus processes inquiries for a plurality of service categories;
the load monitor/control section monitors the load on the central management/control apparatus for each of the service categories, each number data therein, and each of the inquiry execution apparatus requesting inquiries, and determines the control rate appropriate to the load, and
the load processing section rejects inquiries in proportion to the control rate for each of the service categories, each number data therein, and each of the inquiry execution apparatus.

14. An apparatus according to claim 2, wherein;
the load monitor/control section monitors the load on the central management/control apparatus for each of areas requesting services and each of the inquiry execution apparatus requesting inquiries, and determines the control rate appropriate to the load, and
the load processing section rejects inquiries in proportion to the control rate for each of the areas and each of the inquiry execution apparatus.

15. An apparatus according to claim 2, wherein the load processing section rejects inquiries in accordance with a proportion based on the control rate only for a predesignated area and a predesignated inquiry execution apparatus.

16. An apparatus according to claim 2, wherein;
the central management/control apparatus processes inquiries for a plurality of service categories,
the load monitor/control section monitors the load of the central management/control apparatus for each area requesting service, each of the inquiry execution apparatus requesting inquiries, and each of the service categories, and determines the control rate appropriate to the load, and
the load processing section rejects inquiries in proportion to the control rate for each of the areas, each of the inquiry execution apparatus, and each of the service categories.

17. An apparatus according to claim 2, wherein the load processing section rejects inquiries in accordance with a proportion based on the control rate only for a predesignated area, a predesignated inquiry execution apparatus, and a predesignated service category.

18. An apparatus according to claim 2, wherein
the central management/control apparatus processes inquiries for a plurality of service categories,
the load monitor/control section monitors the load on the central management/control apparatus for each area requesting service, each of the inquiry execution apparatus requesting inquiries, each of the service categories, and each number data therein, and determines the control rate appropriate to the load, and
the load processing section rejects inquiries in proportion to the control rate for each of the areas, each of the inquiry execution apparatus, each of the service categories, and each number data therein.

19. An apparatus according to claim 2, wherein the load processing section rejects inquiries in accordance with the proportions based on the control rate only for a predesignated subscriber.

20. An apparatus according to claim 2, wherein the load processing section rejects inquiries in accordance with a proportion based on the control rate only for a predesignated subscriber class.

21. An apparatus according to claim 2, wherein the load processing section rejects inquiries in accordance with the proportions based on the control rate only for a predesignated information attribute.

22. An apparatus according to claim 2, wherein the load processing section rejects inquiries in accordance with the proportions based on the control rate only for an inquiry for which a predetermined password is not entered.

23. An apparatus according to claim 2, further comprising means for rejecting all inquiries arising from calls of a predesignated kind.

24. A load control apparatus, connected to at least one inquiry execution apparatus, for controlling the load on a central management/control apparatus by controlling inquiries issued from the inquiry execution apparatus to the central management/control apparatus responsible for processing and responding to the inquiries, comprising:

means for determining whether an inquiry has arisen from a call of a predesignated kind; and means for rejecting the inquiry arising from a call of the predesignated kind.

* * * * *